(12) United States Patent
Leith

(10) Patent No.: US 8,136,804 B2
(45) Date of Patent: Mar. 20, 2012

(54) TRUSS ASSEMBLY SYSTEMS AND METHODS

(75) Inventor: Brett Leith, Eleva, WI (US)

(73) Assignee: Menard, Inc., Eau Claire, WI (US)

( * ) Notice: Subject to any disclaimer, the term of this patent is extended or adjusted under 35 U.S.C. 154(b) by 1208 days.

(21) Appl. No.: 11/757,070

(22) Filed: Jun. 1, 2007

(65) Prior Publication Data

US 2008/0300713 A1   Dec. 4, 2008

(51) Int. Cl.
 *B27F 7/15* (2006.01)
 *E04C 3/02* (2006.01)
(52) U.S. Cl. ........... 269/37; 269/910; 269/304; 100/913
(58) Field of Classification Search ................ 269/37, 269/910; 100/913; 227/152
 See application file for complete search history.

(56) References Cited

U.S. PATENT DOCUMENTS

| | | | |
|---|---|---|---|
| 3,068,483 A | 12/1962 | Moehlenpah et al. | |
| 3,172,125 A | 3/1965 | Sanford | |
| 3,771,439 A * | 11/1973 | Mort | 100/100 |
| 3,824,919 A * | 7/1974 | Moehlenpah | 100/35 |
| 4,252,058 A * | 2/1981 | Tison | 100/173 |
| 5,361,495 A | 11/1994 | Pyle et al. | |
| 5,833,222 A | 11/1998 | Olden et al. | |
| 5,854,747 A | 12/1998 | Fairlie | |
| 5,867,905 A | 2/1999 | Whale et al. | |
| 6,079,325 A | 6/2000 | LePoire et al. | |
| 6,702,269 B1 | 3/2004 | Tadich | |
| 6,899,324 B2 | 5/2005 | Fredrickson et al. | |
| 6,955,346 B2 | 10/2005 | Anderson | |
| 2003/0196326 A1 | 10/2003 | McAdoo | |
| 2004/0181936 A1 | 9/2004 | Jin et al. | |
| 2004/0207139 A1 | 10/2004 | Fredrickson et al. | |
| 2005/0011375 A1 * | 1/2005 | Donohue | 100/913 |
| 2005/0121844 A1 | 6/2005 | Fredrickson et al. | |
| 2005/0212192 A1 | 9/2005 | Fredrickson et al. | |
| 2006/0061028 A1 | 3/2006 | Fredrickson et al. | |

* cited by examiner

*Primary Examiner* — Lee D Wilson
*Assistant Examiner* — Jamal Daniel
(74) *Attorney, Agent, or Firm* — Merchant & Gould P.C.

(57) ABSTRACT

An automated assembly system for assembling a truss from a plurality of truss members and connection plates includes a plurality of rail assemblies, a plurality of trolleys, a plurality of press assemblies, and a control system. The rail assemblies include stationary rail assemblies and moveable rail assemblies. The trolleys are supported by the rail assemblies. The press assemblies are supported by the trolleys. The press assemblies are configured to embed the connection plates into the truss members. The control system is programmed to control the operation of the automated assembly system. An ejector system is configured to remove assembled trusses from the automated assembly system.

7 Claims, 21 Drawing Sheets

TRUSS ASSEMBLY SYSTEMS AND METHODS

TECHNICAL FIELD

The present disclosure is related to trusses, and more particularly to a system and method for manufacturing the same.

BACKGROUND

Trusses are commonly used in the construction of buildings, such as residential homes and commercial buildings, to provide support to a roof structure. Trusses come in various sizes, shapes, materials, and configurations. Trusses are commonly made of wood. Many truss configurations include a generally triangular outer shape and include a bottom chord, two top chords, and a plurality of web members. The bottom chord is oriented generally horizontal when installed on a building. Each top chord extends from an opposite end of the bottom chord. The joints between the top chords and the bottom chord are commonly referred to as heels. The ends of each top chord, opposite the heel, are connected together at a location referred to as the peak. A plurality of web members are connected in the space formed between the bottom chord and the top chords, often being arranged to form triangular patterns to distribute sheer forces within the truss.

Joints between the top chords, bottom chord, and web members are often connected using a connector plate. The connector plates are typically formed of a metal material and are formed as a rectangular sheet. The connector plate usually includes a plurality of nail-like regions that have been punched from the plate and bent such that they extend generally normal to a primary surface of the plate.

To construct the truss, the various wood members are first cut having the appropriate length and shape. The wood members are then arranged into the desired configuration. Metal connector plates are then placed over each joint and pressed into the wood to secure the members at the joint. A press head can be used to press the plate into the joint.

SUMMARY

The present disclosure is generally directed to the automated assembly of trusses. In some embodiments, and by non-limiting example, an automated truss assembly system includes a plurality of press heads for connecting members of a truss. The press heads are supported by a trolley and transport the press head along a rail. The trolleys are controlled by a control system.

One aspect is an automated assembly system having a plurality of rail assemblies including stationary rail assemblies and moveable rail assemblies, a plurality of trolleys supported by the rail assemblies, a plurality of press assemblies are configured to embed a connection plate into a truss, and a control system programmed to control the operation of the assembly system. In other aspects, the automated assembly system also includes an ejector system configured to remove assembled trusses from the automated assembly system.

Further aspects include a method of operating an automated assembly system for assembling a truss. The method includes operating in a setup mode and operating in a run mode. The setup mode includes receiving setup instructions defining a configuration of the truss, moving to movable rails to positions corresponding with the configuration, and moving the trolleys relative to the rails to positions corresponding with the configuration. The run mode includes receiving truss members and connection plates, and embedding the connection plates into the truss members.

There is no requirement that an arrangement, system, or method disclosed herein include all features characterized herein to obtain some advantage according to this disclosure.

DETAILED DESCRIPTION

Figure 1:
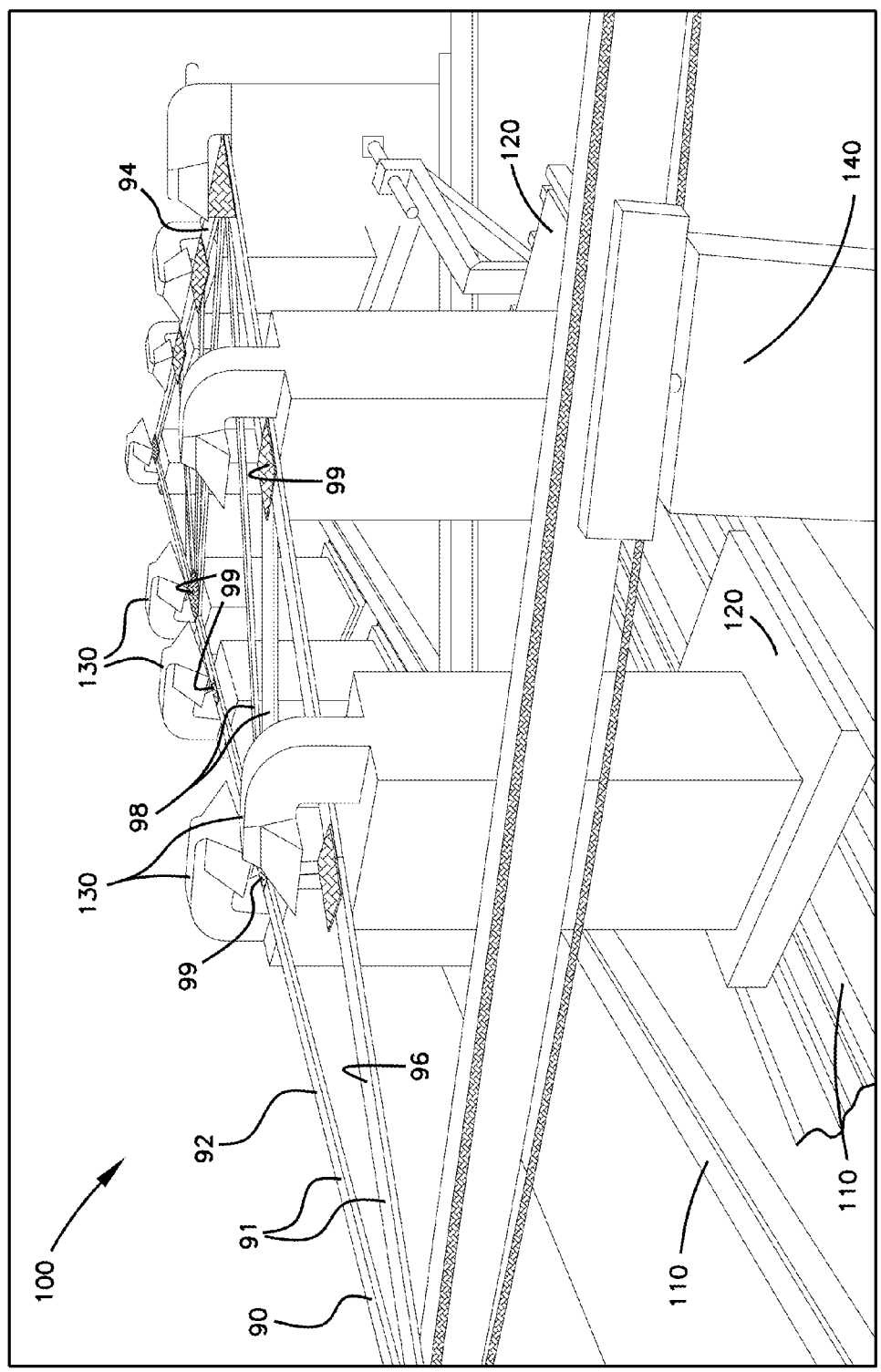
FIG. 1 is a schematic perspective view of an example automated truss assembly system for constructing a truss.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Existing systems and methods of truss assembly suffer from a number of shortcomings. For example, some systems require that the press operators manually push or maneuver heavy press heads whenever reconfiguring the system from one truss configuration to another. This process creates a risk for physical injuries, such as back injuries, especially when considering that the press heads may weigh as much as 500 to 600 pounds. Furthermore, the process of manually reconfiguring the press heads can take a long time, sometimes as much as one and a half to three hours or more. Moreover, hydraulic and electric lines may have to be physically disconnected and reconnected to enable the press heads to be appropriately reconfigured. These lines can themselves become a tripping hazard to the press operators.

After a truss has been assembled, press operators typically have to physically remove the assembled truss from the press heads. This step takes time and physical effort from the press operators leading to reduced productivity and increased physical strain.

This disclosure relates to systems and methods useful in the automated assembly of trusses. One example of an automated assembly system includes a plurality of press heads for embedding connection plates into truss members to form a truss. The press heads are supported on a plurality of trolleys that travel along a plurality of rails. Some of the rails are stationary, while others are moveable. The trolleys are able to move along the rails. As a result, some embodiments overcome problems of existing systems by automatically maneuvering the press heads along the rails, eliminating the need for the press operators to manually position the press heads. Furthermore, the automated assembly system can quickly reposition the press heads, thereby reducing the down time required to adjust to a new configuration.

In some embodiments the moveable rail assemblies are connected between a peak trolley at one end and to opposing heel trolleys at the other ends. The movable rails support a plurality of additional trolleys that each carry a press head, and define a single axis along which the additional trolleys can be moved. Therefore, one of the benefits of these embodiments is that the press heads on the movable rails, and those on the peak and heel trolleys, will be automatically and properly aligned upon adjustment of the peak and heel trolleys into the desired positions. In other words, the press heads need not be individually positioned to achieve proper alignment. Another benefit is that movement of the single peak trolley will automatically move both movable rails and all trolleys and press heads associated with the movable rails. In this way the process of adjusting the automated assembly system into a different configuration is simplified.

Some embodiments include an automated ejector system for removing assembled trusses from the automated assembly system. The ejector system automatically operates to remove the trusses, such that the press operators are not required to manually remove the trusses after assembly. This reduces the risk of injury and the amount of physical exertion required by the press operators. In addition, the ejector system can remove the truss more quickly, thereby increasing productivity.

Figure 2:
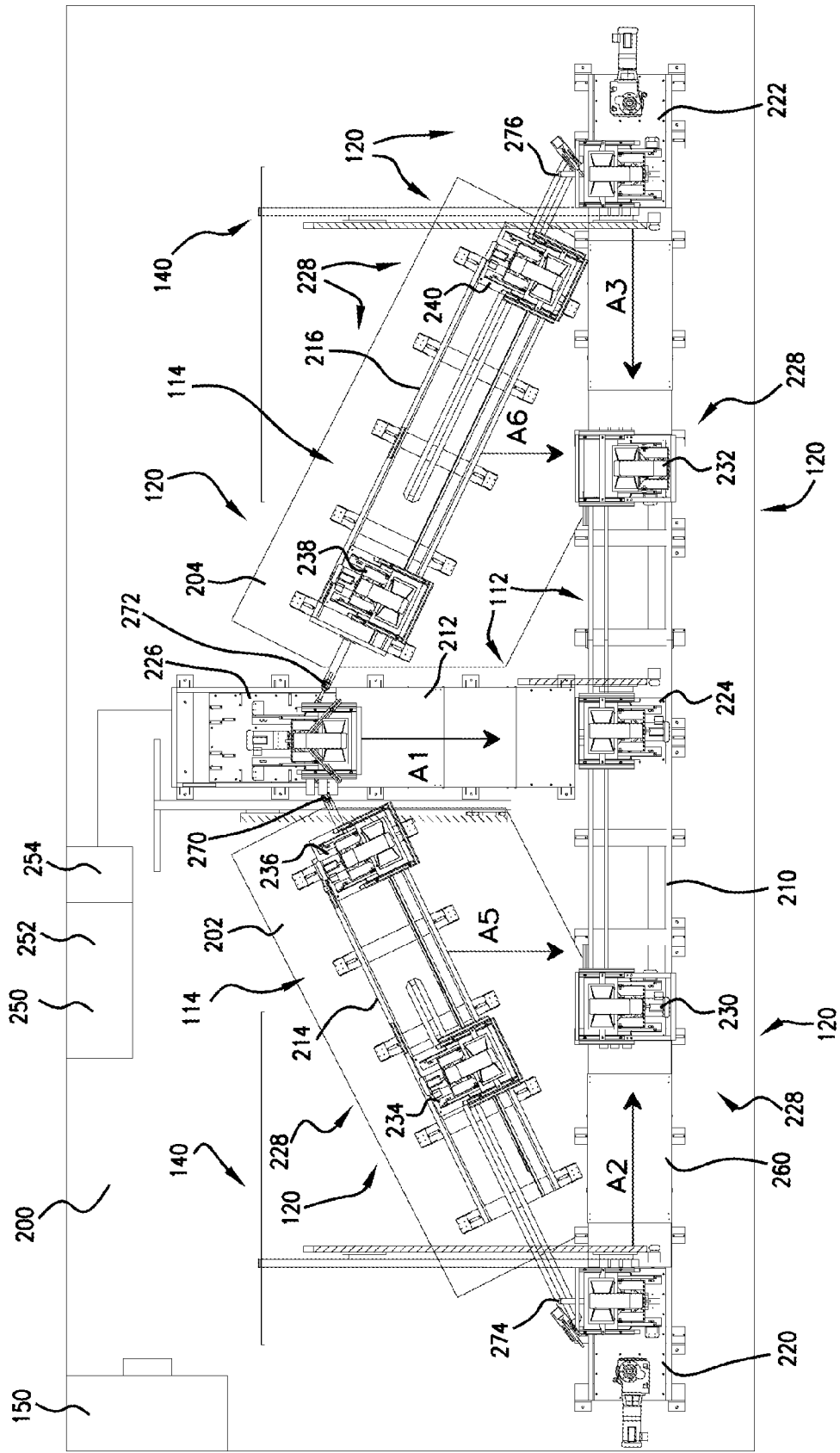
FIG. 2 is a schematic top view of the assembly system shown in FIG. 1.

FIG. 1 is a perspective view of an example automated truss assembly system 100 for constructing a truss 90. Truss 90 is formed of truss members 91 and connection plates 99. Truss members 91 include bottom chord 92, left top chord 94, right top chord 96, and a plurality of web members 98. FIGS. 1 and 2 illustrate the assembly system 100 including rails 110, trolleys 120, press assemblies 130, ejector system 140, and control system 150.

Assembly system 100 includes rails 110 that support and guide the movement of one or more trolleys 120. Trolleys 120 are movable along rails 110, and operate to support and transport a press assembly 130. The press assemblies operate to embed a connection plate (not shown) into truss 90 to assemble the truss 90. An ejector system 140 is provided to remove truss 90 from assembly system 100 after assembly. Assembly system 100 is controlled by control system 150 (shown in FIG. 2).

As one example, assembly system 100 operates to assemble truss 90. Assembly begins with the placement of truss members on and between press assemblies 130, as shown in FIG. 1. Connection plates are placed on the intersections between truss members, and then press assemblies 130 are actuated to embed the connection plates into the truss members to rigidly connect the truss members together to form truss 90. Following the assembly of truss 90, ejector system 140 is actuated to remove truss 90 from press assemblies 130.

FIG. 2 is a top view of example assembly system 100. Assembly system 100 includes rails 110, trolleys 120, press assemblies 130, ejector system 140, and control system 150, such as shown in FIGS. 1 and 2. Assembly system 100 also includes foundation 200, left plate 202, and right plate 204. Rails 110 include stationary rail assemblies 112 and moveable rail assemblies 114. Stationary rail assemblies 112 include bottom chord rail 210 and peak rail 212. Moveable rail assemblies 114 include left rake rail 214 and right rake rail 216. Reference numeral 120 (e.g., trolleys 120) is used herein to refer to all trolleys of assembly system 100 generally including left heel trolley 220, right heel trolley 222, splice trolley 224, peak head trolley 226, and chord web panel trolleys 228. Reference numeral 228 (e.g., chord web panel trolleys 228) is used herein to refer to the set of trolleys including bottom left trolley 230, bottom right trolley 232, top left trolley 234, top left center trolley 236, top right center trolley 238, and top right trolley 240. In some embodiments, chord web panel trolleys 228 carry a press assembly that operates to connect the chord web panels of truss 90. Each trolley 120 carries a press assembly 130, which includes a stand and a press head.

Foundation 200 is, for example, a poured concrete foundation. In some embodiments, foundation 200 is a concrete slab of a building in which assembly system 100 is housed. In another embodiment, foundation 200 is a separate concrete foundation. In yet another embodiment, foundation 200 is formed of pre-fabricated concrete slabs. Some concrete embodiments of foundation 200 include steel reinforcement to provide additional strength and resist cracking. Other embodiments include a foundation formed of materials other than or in addition to concrete, such as wood, metal, metal alloys, stone, asphalt, sand, or other materials. In another embodiment, assembly system 100 is supported by the ground. In some embodiments, foundation 200 has a thickness sufficient to support the weight of assembly system 100. For example, foundation 200 has a thickness in a range from about ½ inch to about 24 inches, and preferably from about 4 inches to about 12 inches.

Left and right plates 202 and 204 are placed on top of foundation 200 and thereby supported by foundation 200. In one embodiment, left and right plates 202 and 204 are formed of metal, such as steel, which is flame cut to the desired shape.

Left plate 202 is arranged to support left rake rail 214 between left heel trolley 220 and peak head trolley 226. Right plate 204 is arranged to support right rake rail 216 between peak head trolley 226 and right heel trolley 222.

In one example, left and right plates 202 and 204 are formed of ⅜ inch steel and are cut to have the desired dimensions. For example, left and right plates 202 and 204 cut to have a width in a range from about 4 feet to about 12 feet, and preferably from about 6 feet to about 10 feet. In addition, left and right plates 202 and 204 are cut to have a length in a range from about 8 feet to about 24 feet, and preferably from about 12 feet to about 20 feet. In another embodiment, left and right plates 202 and 204 have a length in a range from about 75% to about 115% of the length of left and right rakes 214 and 216 respectively. In some embodiments one or more corners of left and right steel plates 202 and 204 can be removed so as to not interfere with peak rail 212. Alternatively, left and right plates 202 and 204 can be formed having other shapes as well, and could also be formed as a single plate or as a group of smaller plates. In addition, left and right plates 202 and 204 can be formed of other materials, such as concrete, wood, metal, metal alloys, plastic, asphalt, or other materials. In other embodiments, left and right plates 202 and 204 are not included, and foundation 200 is used to perform the function of left and right plates 202 and 204.

In the illustrated embodiment, assembly system 100 includes four rails 110 including two stationary rail assemblies 112 and two moveable rail assemblies 114. The stationary rail assemblies 112 include bottom chord rail 210 and peak rail 212. The moveable rail assemblies 114 include left rake rail 214 and right rake rail 216. In the illustrated embodiment, rails 110 include two beams (such as beams 302 and 304 shown in FIGS. 3-4, and beams 502 and 504 shown in FIG. 5). The beams are spaced from each other, and extend substantially parallel to each other. In one example, the two beams are generally straight and have a "C"-shaped cross section, such that the beams each have an inner channel. The beams are oppositely oriented, such that the inner channel of each beam faces toward the inner channel of the other beam. As described herein, trolleys include rollers that travel along and are guided by the beams of rails 110.

Alternative embodiments of rails 110 include more or fewer than four rails. In addition, rails can be composed of multiple rail segments that together operate to function as a single rail. Alternative embodiments of rails 110 also include more or fewer than two beams. For example, a monorail design could be used where a trolley rides on a single beam. In addition, three, four, or more rails could also be used. In some embodiments, the rails can be located in various arrangements. For example, rails can be positioned underneath a trolley, on the sides of the trolley, on the sides of the press assemblies, and/or through the press assemblies.

The stationary rail assemblies 112, including bottom chord rail 210 and peak rail 212, are fastened to foundation 200. In this way, bottom chord rail 210 and peak rail 212 are fixed to foundation 200 such that they remain stationary at all times. Any suitable fastener may be used including concrete anchors, nails, spikes, bolts, adhesive, and the like. Suitable concrete anchors include wedge anchors, strike anchors, drop-in anchors, sleeve anchors, expansion anchors, and the like. Peak rail 212 extends generally perpendicular to a midsection of bottom chord rail 210. The midsection of the bottom chord rail 210 is located between the ends of bottom chord rail 210, and need not be directly at the center. For ease of reference, the portions of bottom chord rail 210 on either side of the midsection are referred to as segments of bottom chord rail 210.

The moveable rail assemblies 114, including left rake rail 214 and right rake rail 216, rest on top of left plate 202 and right plate 204, respectively, and are not fastened to foundation 200. The moveable rail assemblies 114 include a set of rollers (e.g., 512 shown in FIG. 5) that are selectively extendable to enable the moveable rail assemblies 114 to roll on top of left plate 202 and right plate 204 when operating in a setup mode. Left rake rail 214 is located between bottom chord rail 210 and peak rail 212, and between left heel trolley 220 and peak head trolley 226. Left rake rail 214 is also located between peak rail 212 and a first segment of bottom chord rail 210. Right rake rail 216 is located between bottom chord rail 210 and peak rail 212, and between right heel trolley 222 and peak head trolley 226. Right rake rail 216 is also located between peak rail 212 and a second segment of bottom chord rail 210. Therefore, in some embodiments, left rake rail 214, right rake rail 216, and bottom chord rail 210 can be arranged to form a generally triangular shape.

Trolleys 120 are moveably supported by rails 110. Bottom chord rail 210 guides left heel trolley 220, bottom left trolley 230, splice trolley 224, bottom right trolley 232, and right heel trolley 222. Left heel trolley 220 and right heel trolley 222 are located closest to the ends of bottom chord rail 210. Between left heel trolley 220 and right heel trolley 222 is bottom left trolley 230, splice trolley 224, and bottom right trolley 232. Splice trolley 224 is located between bottom left trolley 230 and bottom right trolley 232. Each of the trolleys 120 carry a press assembly 130 described in more detail herein. Alternatively, any other number and arrangement of trolleys can be supported on bottom chord rail 210, depending on the desired configuration of truss 90 to be assembled by assembly system 100.

Left rake rail 214 is connected at one end to left heel trolley 220 at pivot point 274, and at the other end to peak head trolley 226 at pivot point 270. Right rake rail 216 is connected at one end to right heel trolley 222 at pivot point 276 and at the other end to peak head trolley 226 at pivot point 272. As a result, when either or both of left heel trolley 220 and peak head trolley 226 are advanced along their respective rails, left rake rail 214 is moved. Similarly, when either or both of right heel trolley 222 and peak head trolley 226 are advanced along their respective rails, right rake rail 216 is also moved.

Left and right rake rails 214 and 216 are configured to move partially underneath bottom chord rail 210. In order for this movement to occur, left and right rake rails 214 and 216 are slidably connected to the respective left and right heel trolleys 220 and 222 at pivot points 274 and 276. For example, if peak head trolley 226 moves in the direction of arrow A1, and left heel trolley moves in the direction of arrow A2, left rake rail 214 is going to move in the general direction of arrow A5. As a result of such movement, left rake rail 214 will be moved in the general direction of arrow A6. If necessary, left rake rail 214 can pivot relative to peak head trolley 226 at pivot point 270, but left rake rail 214 does not move toward or away from peak head trolley 226 at pivot point 270.

In mathematics, the lengths of the sides of a right triangle can be determined using the Pythagorean theorem. The theorem states that in any right triangle, the area of the square whose side is the hypotenuse (the side of a right triangle opposite the right angle) is equal to the sum of areas of the squares whose sides are the two legs (the two sides other than the hypotenuse).

When peak head trolley 226 is moved in the direction of arrow A1, the distance between bottom chord rail 210 and peak head trolley (a "side" of a right triangle) is reduced. In addition, when left heel trolley 220 is moved in the direction of arrow A2, the distance between bottom chord rail 210 and peak rail 212 (another "side" of the right triangle) is also reduced. As a result, the distance between peak head trolley 226 and left heel trolley 220 (the hypotenuse) is also reduced.

The same holds true with respect to right rake rail 216. If peak head trolley 226 is moved in the direction of arrow A1 and right heel trolley 222 is moved in the direction of arrow A3, the distance between peak head trolley 226 and right heel trolley 222 is also reduced.

In order to accommodate for the reduced distance between peak head trolley 226 and left heel trolley 220, and between peak head trolley 226 and right heel trolley 222, left and right rake rails 214 and 216 are allowed to slide underneath bottom chord rail 210 when needed. To do this, left rake rail 214 is pivotably and slidably connected to pivot point 274 of left heel trolley 220. Similarly, right rake rail 216 is pivotably and slidably connected to pivot point 276 of right heel trolley 222. As a result, the end of left and right rake rails 214 and 216 (opposite peak head trolley 226) is able to extend underneath bottom chord rail 210, which is elevated from foundation 200. More specifically, the sliding arms (e.g., sliding arm 520, shown in FIG. 5) of left and right rake rails 214 and 216 is able to extend below bottom chord rail 210.

Ejector system 140 is an ejection and conveyor system that automatically removes assembled trusses from press assemblies 130 and delivers them to a desired location away from assembly system 100. After a truss has been assembled, ejector system 140 lifts the truss in a vertically upward direction from press assemblies 130. A conveyor system then moves the truss to another location, such as onto another conveyor system or to a truss stacking system. Ejector system 140 then lowers to allow another truss to be assembled.

The operation of assembly system 100 is controlled by control system 150. Control system 150 includes a processor, such as a computer system or a programmable logic device. The control system 150 receives inputs from a user, such as to identify a desired truss configuration. Control system 150 also sends control signals to trolleys 120 and receiving signals from trolleys 120. For example, position signals are sent from trolleys 120 to inform control system 150 of the position of the trolley.

In one embodiment, assembly system 100 further includes one or more supplies. For example, assembly system 100 includes power supply 250, hydraulic fluid supply 252, and compressed air supply 254. Power supply 250 is, for example, a 120 V alternating current electric supply. Power supply 250 receives electricity from a power grid or power plant. Alternatively, a generator is used to generate the electric supply. Power supply 250 is used to supply electricity to electronic circuits including control system 150, electric solenoids, electronically controlled valves, and electric motors. Power from power supply 250 is routed to the electronic circuits through wires or power cables. Hydraulic fluid supply 252 includes a hydraulic fluid source, such as a storage tank, and a hydraulic pump. Hydraulic fluid supply 252 provides hydraulic fluid to the hydraulic components, such as the press heads, through hydraulic lines, such as pipes, tubes, or flexible hoses. In one embodiment, hydraulic fluid supply 252 supplies hydraulic fluid having a maximum pressure in a range from about 500 pounds per square inch (PSI) to about 3000 PSI, and preferably from about 1500 PSI to about 2500 PSI. This range has been found to be sufficient to fully embed the connection plates into the trusses. Compressed air supply 254 provides compressed air to air powered (pneumatic) devices. Compressed air supply 254 includes an air compressor that compresses the air. The air is then delivered to air powered devices, including for example, rotary actuators and pneumatic cylinders.

As shown in FIG. 2, plates 260 can be placed on rails 110 and between the trolleys to cover the rails, if desired. This is beneficial to enclose the rails, such as to keep foreign objects out of the region around and between the beams), and also to enable a human operator to more easily walk over the rails.

Figure 3:
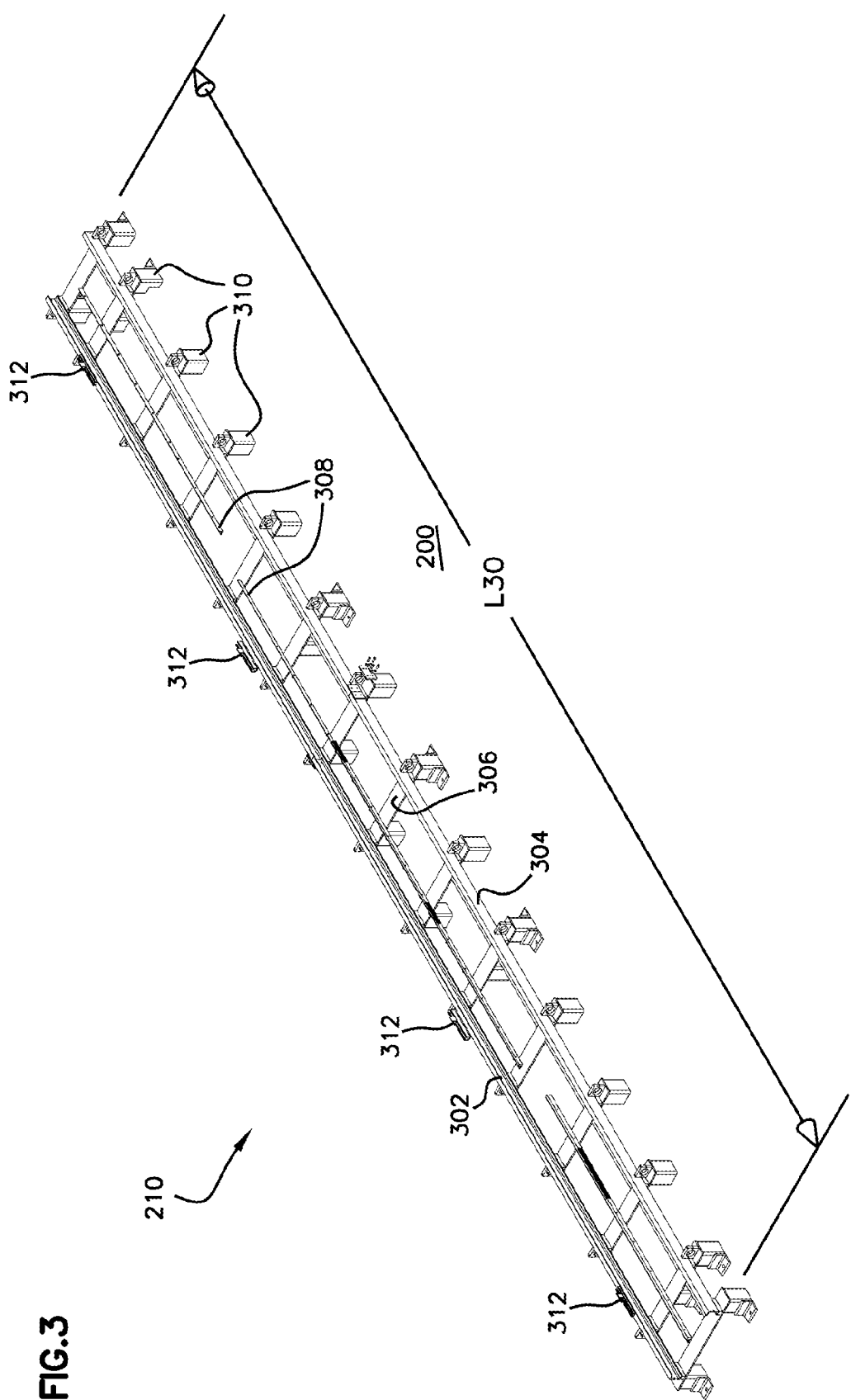
FIG. 3 is a schematic perspective view of an example stationary rail, and more specifically a bottom chord rail of the assembly system shown in FIG. 1.
Figure 4:
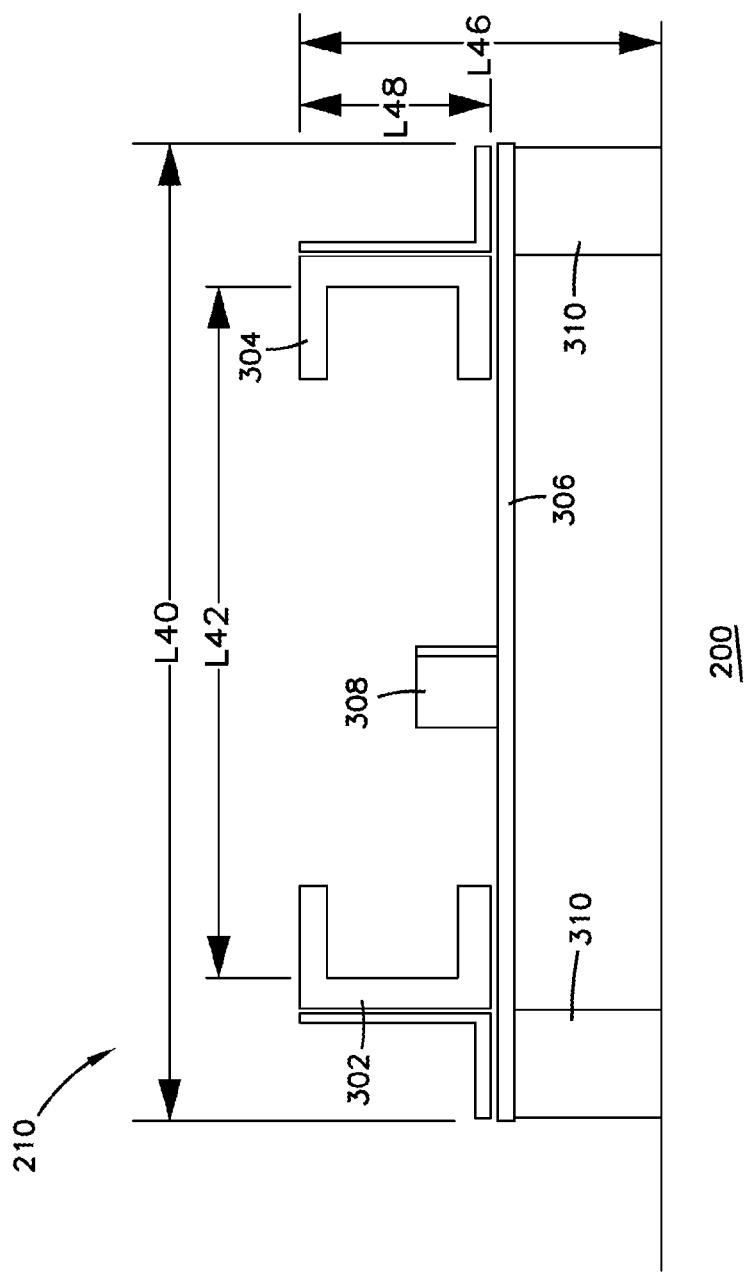
FIG. 4 is a schematic cross-sectional view of the example stationary rail shown in FIG. 3.

FIGS. 3 and 4 illustrate an example stationary rail. FIG. 3 is a perspective view of an example stationary rail, and is more specifically an example of bottom chord rail 210. FIG. 4 is a cross sectional view of an example bottom chord rail 210. Bottom chord rail 210 includes beam 302, beam 304, rail ties 306, gear racking 308, legs 310, and home position markers 312. Peak rail 212 is similar to bottom chord rail 210, and therefore need not be specifically and separately illustrated and described herein.

Bottom chord rail 210 includes a pair of beams 302 and 304, rail ties 306, gear racking 308, and legs 310. Beams 302 and 304 are generally parallel to each other. In one embodiment, beams 302 and 304 are formed of metal and have a "C" shaped cross section. In other embodiments, however, other rail structures such as having solid, hollow, or slotted beams, and other materials can be used. Beams 302 and 304 are supported in their spaced and parallel alignment by a plurality of rail ties 306 that extend between and generally perpendicular to beams 302 and 304.

Gear racking 308 is located between beam 302 and beam 304, and extends generally parallel with beam 302 and beam 304. Gear racking 308 is engaged by a pinion (e.g., 616 shown in FIG. 6) of trolleys 120 (shown in FIG. 2) to advance trolleys 120 along the stationary rail. In the illustrated embodiment, gear racking 308 is oriented such that the gears extend along a side of gear racking 308. In another embodiment, gear racking is oriented such that the gears extend along a top of gear racking 308.

Beams 302 and 304 are spaced from foundation 200 by legs 310. In addition, at least some of legs 310 are fixed to foundation 200 to keep beams 302 and 304 from moving relative to foundation 200. In some embodiments, legs 310 elevate beams 302 and 304. One of the benefits of this is that beams 302 and 304 are out of the way of the moveable rail assemblies 114, which can extend partially underneath beams 302 and/or 304. In order to enable left and right rake rails 214 and 216 (shown in FIG. 2) to extend below bottom chord rail 210, legs 310 are not placed underneath beam 302 in locations where they would interfere with the left and right rake rails 214 and 216.

A home position marker 312 is provided on beam 302 for each trolley. In one example, home position marker 312 is a metal strip that extends vertically from beam 302. In another example, home position marker 312 is a piece of angle iron having a width of about one inch. The home position marker 312 is mounted along the top edge of beam 302 on a piece of uni-strut rail that allows for fine longitudinal adjustment of the home position location. As described herein, each trolley includes a position sensor that detects the presence of home position marker 312. When the position sensor detects the presence of home position marker 312, it generates a signal that is transmitted to the control system to inform the control system that the trolley has reached its home position.

In the illustrated embodiment, bottom chord rail 210 has a length L30 in a range from about 10 feet to about 100 feet, and preferably from about 30 feet to about 60 feet. Bottom chord rail 210 has an overall width L40 in a range from about 20 inches to about 60 inches, and preferably from about 30 inches to about 50 inches. Length L42 is the distance between the inner surfaces of beams 302 and 304. L42 is in a range from about 20 inches to about 60 inches, and preferably from about 25 inches to about 45 inches. L46 is the overall height of bottom chord rail 210 (not including a home position marker). L46 is in a range from about 6 inches to about 20 inches, and preferably from about 12 inches to about 16 inches. L48 is the height of beams 302 and 304. L48 is in a range from about 1 inch to about 12 inches, and preferably from about 3 inches to about 5 inches.

In the illustrated embodiment (such as shown in FIG. 2) peak rail 212 has similar dimensions to bottom chord rail 210, except that it has a shorter length. In this embodiment, peak rail 212 has a length in a range from about 5 feet to about 60 feet, and preferably from about 10 feet to about 25 feet.

These dimensions are provided only as exemplary dimensions of one embodiment. Other embodiments will have other dimensions as dictated by the particular truss size and configuration requirements.

Figure 5:
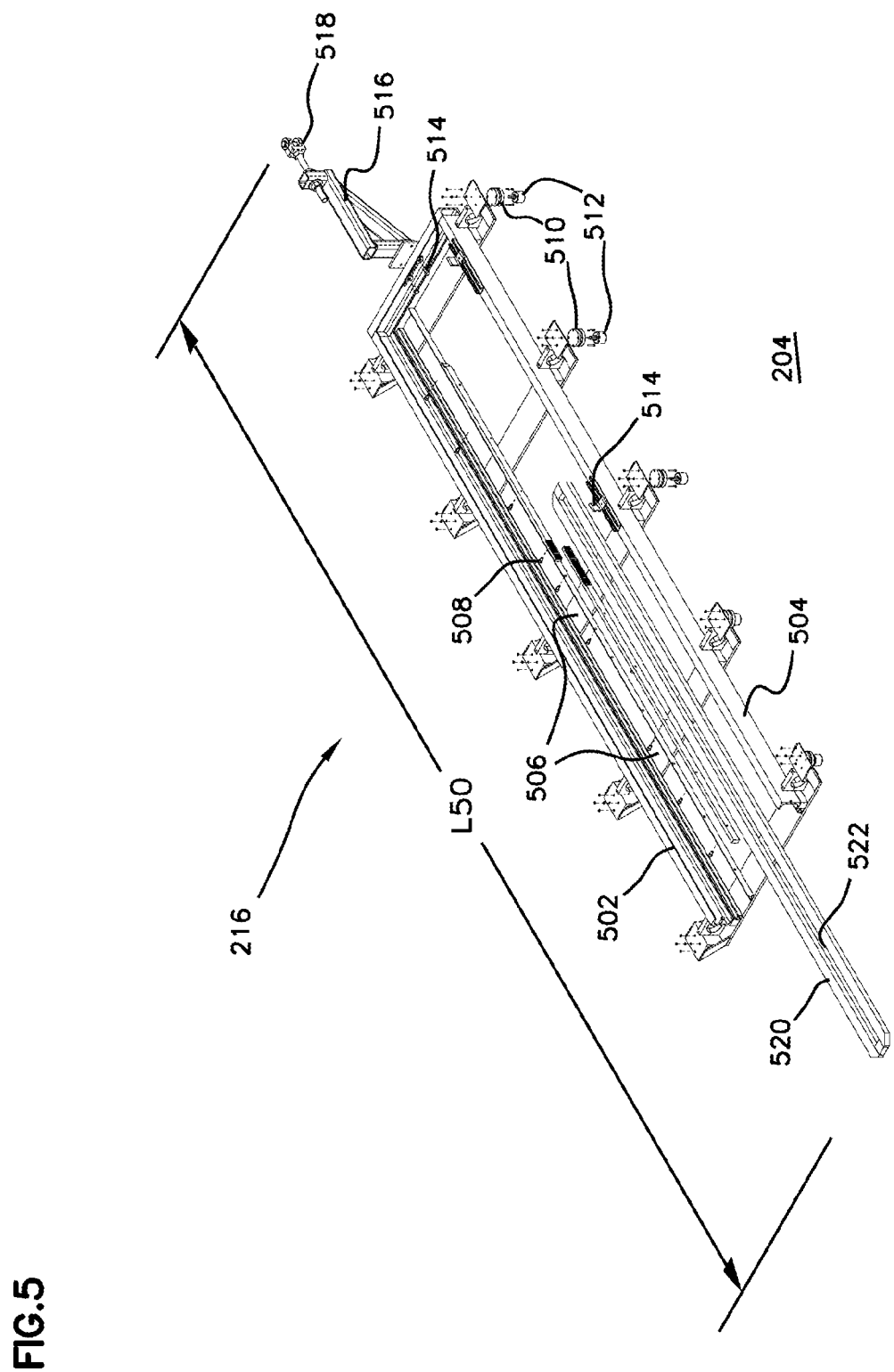
FIG. 5 is a schematic perspective view of an example movable rail, and more specifically a right rake rail of the assembly system shown in FIG. 1.

FIG. 5 is a perspective view of an example moveable rail, and more particularly is an example of right rake rail 216. One of the distinctions between the stationary rail assemblies 112 and the moveable rail assemblies 114 is that the moveable rail assemblies 114 are able to move relative to foundation 200, whereas the stationary rail assemblies 112 are fixed to foundation 200. Left rake rail 214 and right rake rail 216 are mirror images of each other, and therefore left rake rail 218 need not be specifically and separately described herein.

Right rake rail 216 includes a pair of beams 502 and 504, rail ties 506, gear racking 508, air cylinders 510, ball transfer rollers 512, home position markers 514, and sliding arm 520. Beams 502 and 504 are spaced from and generally parallel to each other. In one embodiment, beams 502 and 504 are formed of metal and have a "C" shaped cross section. In other embodiments, however, other known rail structures can be used, such as having solid, hollow, or slotted beams. In other embodiments, beams 502 and 504 are formed of a material such as iron, steel, plastic, metal alloys, wood, plastic, carbon fiber, or other desired materials.

Beams 502 and 504 are supported in their parallel alignment by a plurality of rail ties 506 that extend between beams 502 and 504 having a generally perpendicular orientation to beams 502 and 504. Rail ties 506 include a member that extends below and between beams 502 and 504. At each end of rail ties 506 is a raised region that accommodates an air cylinder 510. The air cylinder is connected at one end to a bottom of the raised region, and extends generally vertically down from the raised region. A ball transfer roller 512 is connected to the air cylinder 510, opposite and vertically down from the raised region. Air cylinder 510 receives compressed air from compressed air supply 254, shown in FIG. 2.

Moveable rail assemblies 114, including left rake rail 214 (shown in FIG. 2) and right rake rail 216 are configured to have two operating modes including a run mode and a setup mode. In the run mode, right rake rail 216 is positioned such that rail ties 506 rest on top of right plate 204, which in turn rests on foundation 200. In this position, right rake rail 216 is unable to move, being held in place by friction between rail ties 506 and right plate 204, and also being held in place by peak head trolley 226 and right heel trolley 222 (shown in FIG. 2).

When it comes time to adjust the configuration of assembly system 100, the moveable rail assemblies 114 are adjusted to the setup mode. When right rake rail 216 is placed into the setup mode, air cylinders 510 (also sometimes referred to as pneumatic cylinders) are activated to extend between the raised region of rail ties 506 and plate 204. In this way, air cylinders provide a force to rail ties 506 sufficient to raise rail ties 506 off of plate 204. Air cylinders 510 need not have a long stroke length, so long as the length is sufficient to raise rail ties 506 from plate 204. In one embodiment, the air cylinder stroke length is in a range from about 0.125 inches to about 1 inch, and preferably from about 0.25 inches to about 0.75 inches. Air cylinders 510 are powered by an air compressor that delivers compressed air to the air cylinders through one or more air hoses. The operating mode of the moveable rail assemblies 114 is controlled by the control system, which selectively activates and deactivates air cylinders 510.

Gear racking 508 is located between beam 502 and beam 504, and extends generally parallel with beam 502 and beam 504. Gear racking 508 is engaged by a pinion of trolleys 120 to advance trolleys 120 along the moveable rail. In the illustrated embodiment, gear racking 508 is oriented such that the gears extend along a side of gear racking 508. In another embodiment, gear racking is oriented such that the gears extend along a top of gear racking 508, or in any other desired orientation or configuration.

A home position marker 514 is provided on beam 504 for each trolley. In one example, home position marker 514 is a metal strip that extends vertically from beam 504. In another example, home position marker 514 is a piece of angle iron having a width of about one inch. The home position marker 514 is mounted along the top edge of beam 504 on a piece of uni-strut rail that allows for fine adjustment of the home position location. As described herein, each trolley includes a position sensor that detects the presence of home position marker 514. When the position sensor detects the presence of home position marker 514, it generates a signal that is transmitted to the control system to inform the control system that the trolley has reached its home position.

Right rake rail 216 is connected between peak head trolley 226 and right heel trolley 222. Right rake rail 216 is connected to peak head trolley 226 with arm 516 and clevis assembly 518. Clevis assembly 518 enables right rake rail 216 to be pivotally connected to peak head trolley 226, enabling right rake rail 216 to pivot horizontally relative to peak head trolley 226. Furthermore, clevis assembly 518 is sized to provide right rake rail 216 with some space for vertical travel. This can help right rake rail 216 to raise and lower without applying a substantial vertical force to peak head trolley 226. Rather, clevis 518 is able to slide vertically up and down relative to peak head trolley 226 when adjusted between the run mode and the setup mode.

Right rake rail 216 is also connected to right heel trolley 222 via sliding arm 520. Sliding arm 520 is pivotally and slidably connected to right heel trolley 222 through slot 522 extending longitudinally through a centerline of sliding arm 520. Sliding arm 520 is fastened to some of rail ties 506 that maintain sliding arm in a horizontal position that is generally parallel with beams 502 and 504. In an alternate embodiment, sliding arm 520 slidably connected to rail ties 506 at one end and is pivotally connected at the other end to right heel trolley 222. In this embodiment, left and right rake rails 214 and 216 expand and contract to conform to the variable distances between the peak head trolley 226 and the left and right heel trolleys 220 and 222.

Right rake rail 216 has an overall length L50 in a range from about 10 feet to about 75 feet and preferably from about 20 feet to about 50 feet.

Figure 6:
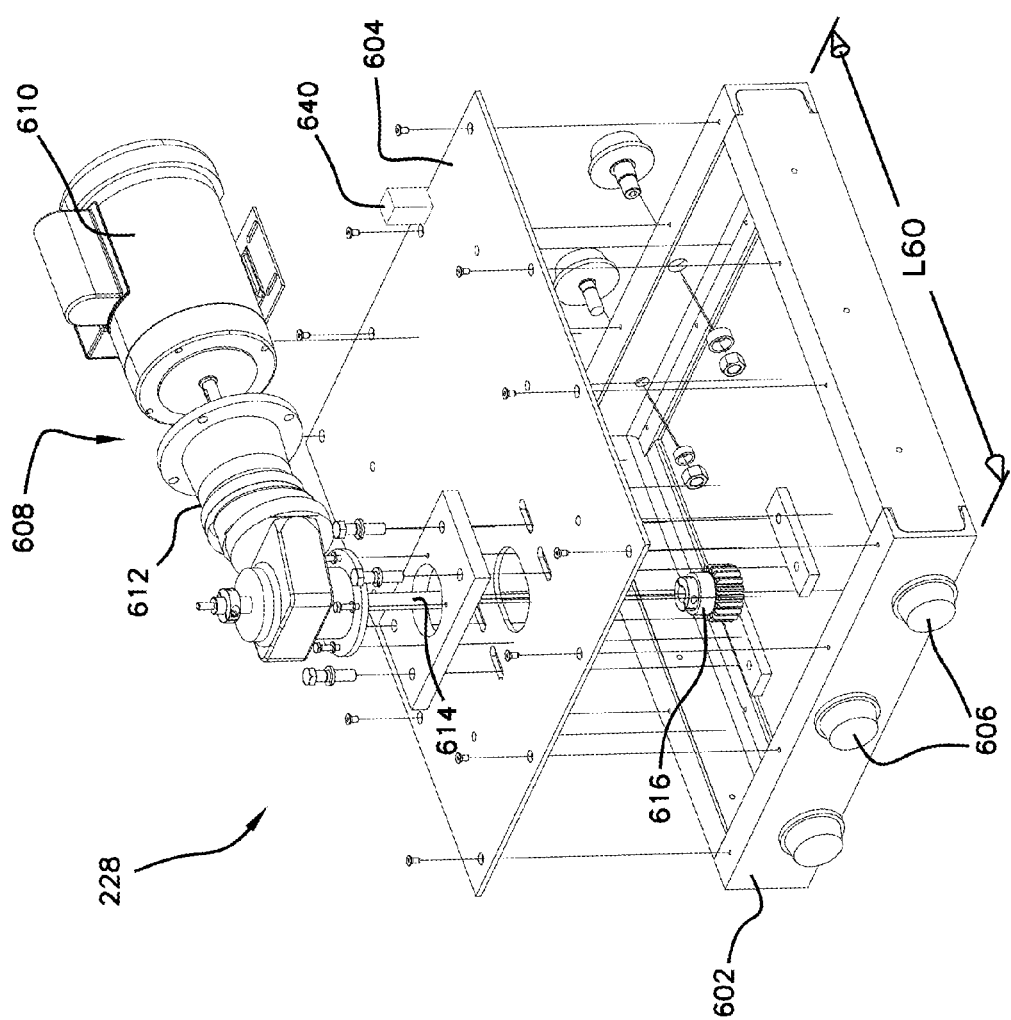
FIG. 6 is a schematic partially exploded perspective view of an example chord web panel trolley of the assembly system shown in FIG. 1.

FIG. 6 is a partially exploded perspective view of an example chord web panel trolley 228 that includes any one of bottom left trolley 230, bottom right trolley 232, top left trolley 234, top left center trolley 236, top right center trolley 238, and top right trolley 240 (shown in FIG. 2). In addition, splice trolley 224 is also the same or similar to chord web panel trolley 228, and therefore need not be specifically and separately described herein. Chord web panel trolley 228 is designed and configured to transport a press head assembly (such as 1100 shown in FIGS. 11-12).

Chord web panel trolley 228 includes frame 602, lid 604, rollers 606, and drive system 608. In the illustrated embodiment, frame 602 is a box frame formed of four C-channel beams. For example, frame 602 is formed of four segments of 4 inch structural C-channel steel. The beams are fastened together at each end to form a square or rectangular frame. The beams are fastened by welding. Alternatively, beams can also be fastened with screws, nails, nuts and bolts, rivets, adhesive, and the like. Lid 604 is connected to a top side of frame 602, and is formed, for example, from a metal plate having a square or rectangular shape to cover the top side of frame 602. Any suitable fastener can be used. A press head assembly can be mounted to the top surface of lid 604 where it is supported and transported by chord web panel trolley 228.

Rollers 606 extend out from opposite sides of frame 602 to enable chord web panel trolley 228 to roll along the respective rails. Rollers 606 are, for example three inch cam roller bearings that roll within the channel of the respective rail beams. In the illustrated embodiment, some of the rollers 606 are vertically offset from other rollers 606 such that the lower rollers make contact with a lower inside surface of the rail beam, while the other rollers make contact with an upper inside surface of the rail beam. This arrangement increases the stability of chord web panel trolley 228.

Drive system 608 is mounted to lid 604 and provides the drive force necessary to advance chord web panel trolley 228 along the respective rail. Drive system 608 includes motor 610, gear system 612, shaft 614, and pinion 616. Power for drive system 608 is generated by motor 610. In one example, one or 610 is a 120 V electric motor, although various other motors could also be used. In the illustrated embodiment, motor 610 is horizontally oriented and connected to gear system 612. Gear system 612 reduces the rotational speed and increases the torque delivered to pinion 616. One example of gear system 612 is a worm gear. Shaft 614 delivers power from gear system 612 to pinion 616. Shaft 614 extends vertically down through an orifice in lid 604. Pinion 616 is connected to an end of shaft 614 opposite gear system 612 such that pinion 616 rotates around a vertical axis. In some embodiments, pinion 616 is a spur gear. Pinion 616 is configured to engage the gear racking of the respective rail to advance chord web panel trolley 228 along the rail when in a setup mode, or to stabilize chord web panel trolley 228 when in a run mode.

Length L60 is the overall width of chord web panel trolley 228. Length L60 is slightly smaller than the inside width of the rails, such as width L42 shown in FIG. 4, to allow the rollers 606 of chord web panel trolley 228 to fit within the rail. For example, length L60 is in a range from about 0.125 to about 2 inches less than length L42, and preferably from about 0.25 to about 0.5 inches shorter than length L42. Other embodiments will have other dimensions.

Figure 7:
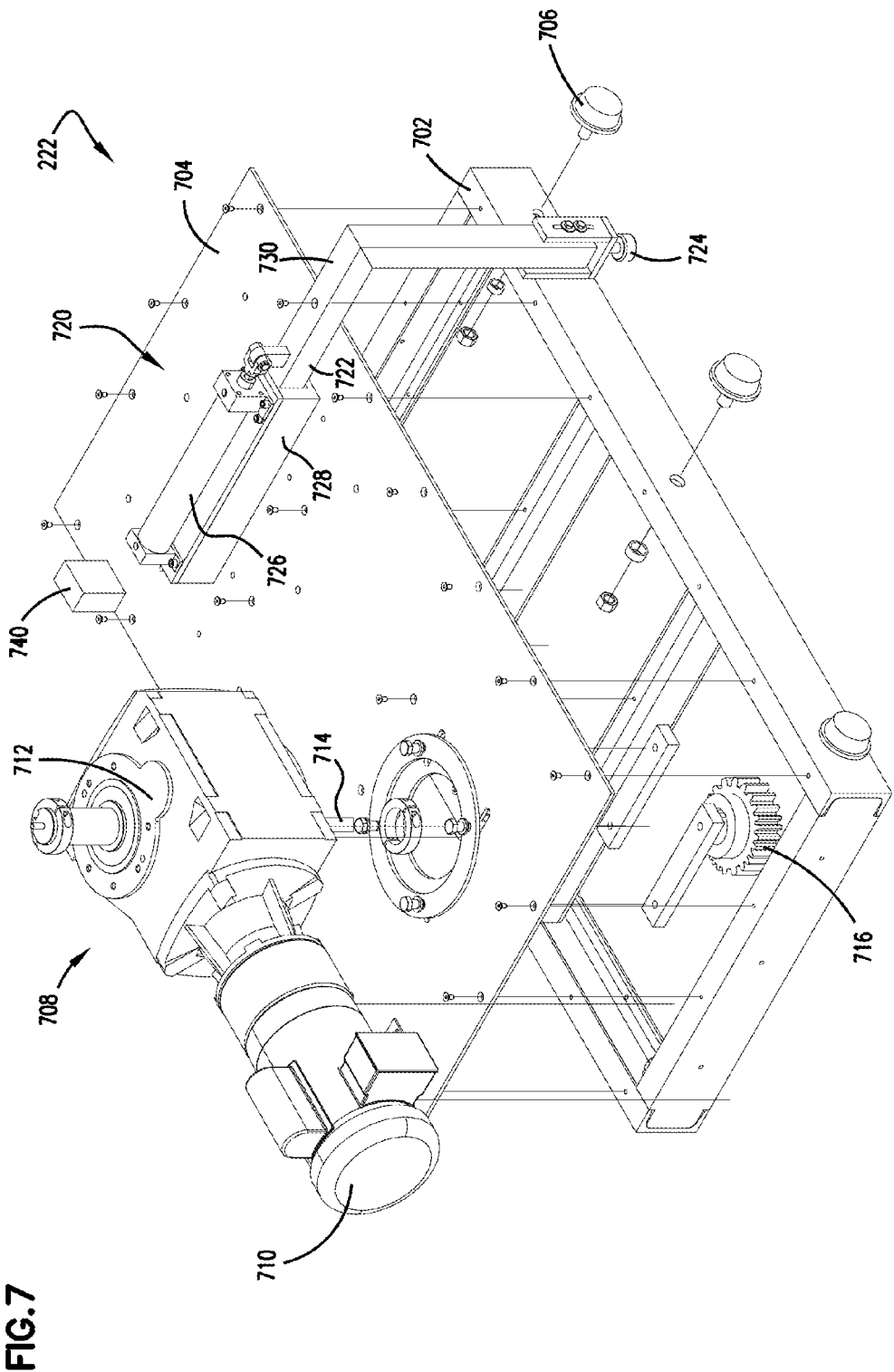
FIG. 7 is a schematic partially exploded perspective view of an example right heel trolley of the assembly system shown in FIG. 1.

FIG. 7 is a partially exploded perspective view of an example right heel trolley 222. In addition, left heel trolley 220 is the same or similar to right heel trolley, and therefore need not be specifically and separately described herein. As shown in FIG. 7, right heel trolley 222 is similar to chord web panel trolley 228, shown in FIG. 6, except that right heel trolley 222 is longer than chord web panel trolley 228 in some embodiments. In this way, drive system 708 is offset from the mounting location of the press head assembly to make room for the height adjustment assembly, described herein.

Right heel trolley 222 includes frame 702, lid 704, rollers 706, drive system 708, and height adjustment assembly 720.

Frame 702 is a rectangular box formed of four segments that are fastened together at the ends, such as by welding. In some embodiments, frame 702 also includes lateral support members to provide additional strength and stability to frame 702. Lid 704 is fastened to a top side of frame 702, which supports drive system 708. In addition, a press head assembly is supported and transported on top of lid 704. Rollers 706 are rotatably connected to opposite sides of frame 702, which enable right heel trolley 222 to roll along bottom chord rail 210. In some embodiments, rollers 706 are vertically offset from each other such that the lower roller(s) contact a lower inside surface of the rail beam while the higher roller(s) contact an upper inside surface of the rail beam.

Drive system 708 provides the drive force necessary to advance right heel trolley 222 along bottom chord rail 210 when in a setup mode. In addition, the drive force generated by drive system 708 also assists in the adjustment of right rake rail 216 when in a setup mode. Some embodiments of drive system 708 are more powerful than the drive system of chord web panel trolleys 228, because drive system 708 needs to have enough power to move both itself, right rake rail 216, and the chord web panel trolleys located on right rake rail 216.

Drive system 708 includes motor 710, gear system 712, shaft 714, and pinion 716. Motor 710 is a 120V electric motor that provides a rotational force to gear system 712. In one embodiment, gear system 712 is a worm gear. Gear system 712 delivers the rotational force to shaft 714, while reducing the rotational speed and increasing the torque. The resulting rotational force is then supplied by shaft 714 to pinion 716. Pinion 716 is, for example, a spur gear. Pinion 716 engages with gear racking 308 (shown in FIG. 3) of bottom chord rail 210 to convert the rotational force into a linear force that advances right heel trolley 222 along bottom chord rail 210.

Height adjustment assembly 720 is mounted to a top surface of lid 704. Height adjustment assembly 720 connects between right heel trolley 222 and right rake rail 216. Height adjustment assembly 720 includes height adjustment arm 722, cam roller 724, and air cylinder 726. Height adjustment arm 722 includes housing 728 and extension beam 730. Housing 728 includes an orifice sized to slidably receive an end of extension beam 730. Housing 728 is fastened to lid 704 by any suitable fastener, including screws, nuts and bolts, and the like. Extension beam 730 is a generally "L" shaped member that extends horizontally out from housing 728 and then vertically downward to a position vertically lower than frame 702.

Cam roller 724 is connected to extension beam 730 opposite housing 728. Cam roller 724 includes two generally cylindrical regions. The first region includes a threaded portion that is engages with an end of extension beam 730. The first region also includes a smooth portion having a diameter small enough to fit within slot 522 of sliding arm 520. The second region of cam roller 724 is located opposite the end of extension beam 730 and has a diameter larger than slot 522 of sliding arm 520.

Height adjustment assembly 720 can be connected to sliding arm 520 as follows. First, an end of extension beam 730 opposite housing 728 is aligned with a portion of slot 522 of sliding arm 520. Cam roller 724 is then inserted from below sliding arm 520, through slot 522, and into the end of extension beam 730. In this way, height adjustment assembly 720 is slidably connected to right rake rail 216.

It is sometimes desirable to construct trusses having an increased heel height. Such trusses are sometimes referred to as an energy heel truss or a heel post frame truss. One of the benefits of using a truss having an increased heel height is that it increases the space available in an attic for insulation at the edges of the attic. For example, a typical truss is constructed having a bottom chord that extends horizontally along the bottom of the truss, and two top chords that are inclined members that form a triangular shape with the bottom chord. The intersections between the top chords and the bottom chord are known as heels. When installed in a building, the truss defines the shape of the attic. It is typically desirable to install a layer of insulation in the attic to insulate the interior of the building from the temperature variation on the outside of the building. Although different insulating materials can be used, the insulating properties of insulation are largely determined by the thickness of the insulation. However, the thickness of the insulation is limited in a typical truss at the heels due to the fact that the distance between the top chords and the bottom chord narrows until they intersect at the heel. To solve this problem, an energy heel truss can be constructed that includes an additional vertical member that is inserted between the top chord and the bottom chord, such that they no longer intersect. In this way, insulation can be installed in the attic having the desired thickness throughout.

Assembly system 100 can be adjusted into a configuration that enables assembly system 100 to construct trusses having an increased heel height. To do so, height adjustment assembly 720 is used. When assembly system 100 is configured to construct a typical truss, air cylinder 726 is retracted such that extension beam 730 is also retracted. To adjust assembly system 100 into a configuration for constructing trusses having an increased heel height, assembly system 100 is first placed into the setup mode. Trolleys 120 are then adjusted to their appropriate locations. Air cylinder 726 are activated to apply a force to extension beam 730 that causes extension beam 730 to extend a distance equal to the desired increased heel height. In addition, peak head trolley 226 is also advanced a distance equal to the desired increased heel height away from bottom chord rail 210. Assembly system 100 is now configured for the construction of trusses having an increased heel height, and assembly system 100 is transitioned from the setup mode to the run mode.

Right heel trolley 222 also supports home position sensor 740. Home position sensor 740 operates to detect the presence of a home position marker 312 connected to beam 302 of bottom chord rail 210, and communicating the detection to control system 150. Home position sensor 740 can be any suitable detector, such as an infrared transmitter and receiver, light emitter and detector, a magnetic detector, and the like.

Figure 8:
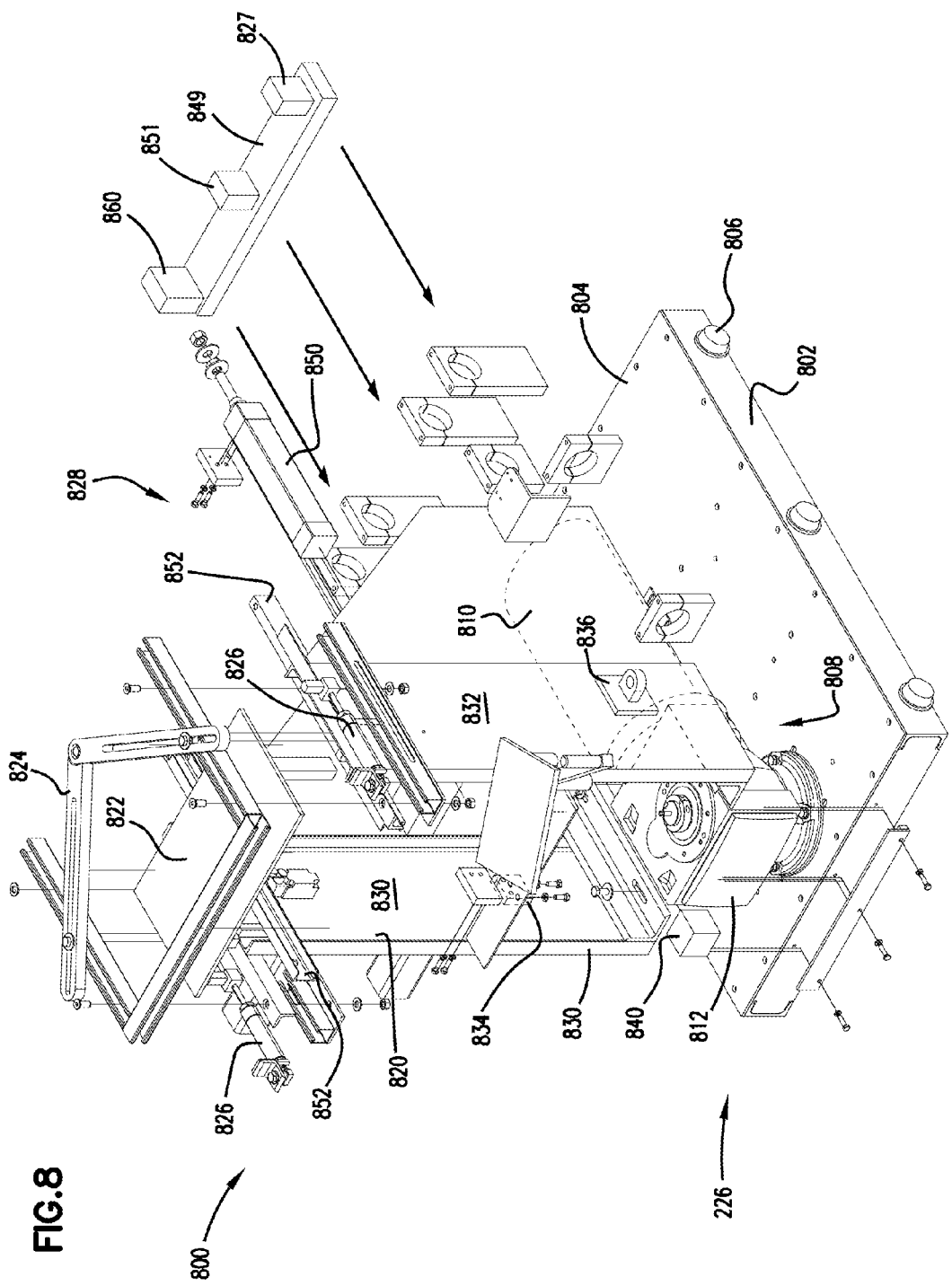
FIG. 8 is a schematic partially exploded perspective view of an example peak head trolley and press stand of the assembly system shown in FIG. 1.

FIG. 8 is a partially exploded perspective view of an example peak head trolley 226 and peak stand 800. Peak head trolley 226 includes frame 802, lid 804, rollers 806, and drive assembly 808. Drive assembly 808 includes motor 810, gear assembly 812, shaft 814, and pinion 816 (not visible in FIG. 8, but similar to shaft and pinions 714 and 716 shown in FIG. 7). Peak head trolley 226 is similar to left and right heel trolleys 220 and 222, with only small differences such as the orientation of drive assembly 808. Lid 804 is connected to a top surface of frame 802 and supports drive assembly 808 and peak stand 800. Rollers 806 extend from opposite sides of frame 802 for engaging with inner channels of peak rail 212, which guides and supports peak head trolley 226.

Peak stand 800 includes housing 820, table 822, peak guide 824, locking mechanism 826, and head adjustment mechanism 828. Housing 820 includes walls 830 and 832, which extend generally vertically up from the top of lid 804 of peak head trolley 226. Housing 820 is fastened to lid 804 by any suitable means, such as bolts and nuts, screws, rivets, adhesive, and the like. In one embodiment, housing 820 is formed of sheet metal having various bends and support members for added strength and stability. Housing 820 also includes a pair of mounting points 834 and 836. The mounting points each extend in opposite directions out from outer surfaces of walls 830 and 832 and include vertically oriented orifice. The orifice is sized to receive a pin from the clevis (e.g., clevis 518 shown in FIG. 5), to connect peak stand 800 (and therefore peak head trolley 226) with left and right rake rails 214 and 216.

Stool 849 is connected to peak stand 800 and supports a number of air solenoids, including rake rail air lift solenoid 860, air cylinder solenoid 851, and air lock solenoid 827. The air solenoids are connected to compressed air supply 254 (shown in FIG. 2) such as through a supply hose. Rake rail air lift solenoid 860 is controlled by the control system and operates to control air flow to the air cylinders of the rake rails (such as air cylinders 510 of right rake rail 216, shown in FIG. 5). The compressed air is delivered from rake rail air lift solenoid 860 to air cylinders (e.g., 510 shown in FIG. 5) by a hose or other air delivery channel. Similarly, air lock solenoid 827 is controlled by the control system and operates to control air flow to locking mechanism 826.

Table 822 includes a generally horizontal plate connected across upper surfaces of walls 830 and 832. Peak guide 824 is supported by walls 830 and 832, such that guide portions of peak guide 824 extend at least partially above a top surface of table 822. Peak guide 824 is an adjustable guide assembly that assists in positioning the top chords of a truss during assembly. The angle of peak guide 824 assists in setting the pitch of the truss. During assembly, at least two ends of the truss members are placed against peak guide 824. The truss members are pushed against peak guide 824 to properly position the truss members to form the peak of the truss. The height of peak guide 824 above plate 822 is less than the thickness of the peak truss members, such that the peak guide 824 does not interfere with the press operation.

Locking mechanism 826 includes two air powered pistons located on either side of peak stand 800. The pistons are rigidly connected to peak stand 800 on one end, and include a foot at the other end. The foot extends vertically upward from the piston. Locking mechanism 826 operates to hold truss members in place during the press operation to ensure that the truss members do not move while the connection plates are embedded into the truss members. During truss assembly, the pistons are kept in a normally extended position, such that they do not interfere with the insertion or removal of truss members. After truss members have been inserted and placed against peak guide 824, locking mechanism 826 is activated to retract the feet toward the truss members. The locking mechanism 826 operates to apply a force to the truss members with the foot of each locking mechanism 826 to securely hold the truss members between the foot and peak guide 824. After the press operation has completed, locking mechanism 826 is extended to release the truss members.

Head adjustment mechanism 828 includes air cylinder 850, air cylinder solenoid 851, and tracks 852. Air cylinder 850 is mounted to housing 820 of peak stand 800 and located generally in a central region of peak stand 800, and in a direction away from the bottom chord rail. Air cylinder 850 connects with the head adjustment beam (such as 1120 shown in FIGS. 11-12) of the press head to control the extension and retraction of the press head. Air cylinder 850 is controlled by air cylinder solenoid 851, which is controlled by the control system. Air cylinder solenoid 851 is connected to a hose of compressed air supply 254 (shown in FIG. 2) and operates to control the air flow to air cylinder 850. The press head is normally maintained in a retracted position (such that the solenoid is normally extended), to keep the press head out of the way of plate 822 and peak guide 824 while truss members are being put into place or removed. The press head is then extended when it is time to embed the connection plate into the truss members.

Head adjustment mechanism 828 also includes tracks 852 mounted on inside surfaces of walls 830 and 832. Tracks 852 are generally "C" shaped members having an inner channel facing towards each other. Rollers on the peak head (e.g., such as 1110 shown in FIGS. 11-12) can be inserted within tracks 852 to support the peak head on chord web panel press stand 900.

Peak head trolley 226 also supports home position sensor 840. Home position sensor 840 detects the presence of a home position marker connected to the bottom chord rail, and communicates the detection to the control system. Home position sensor 840 can be any suitable detector, such as an infrared transmitter and receiver, light emitter and detector, a magnetic detector, and the like.

Figure 9:
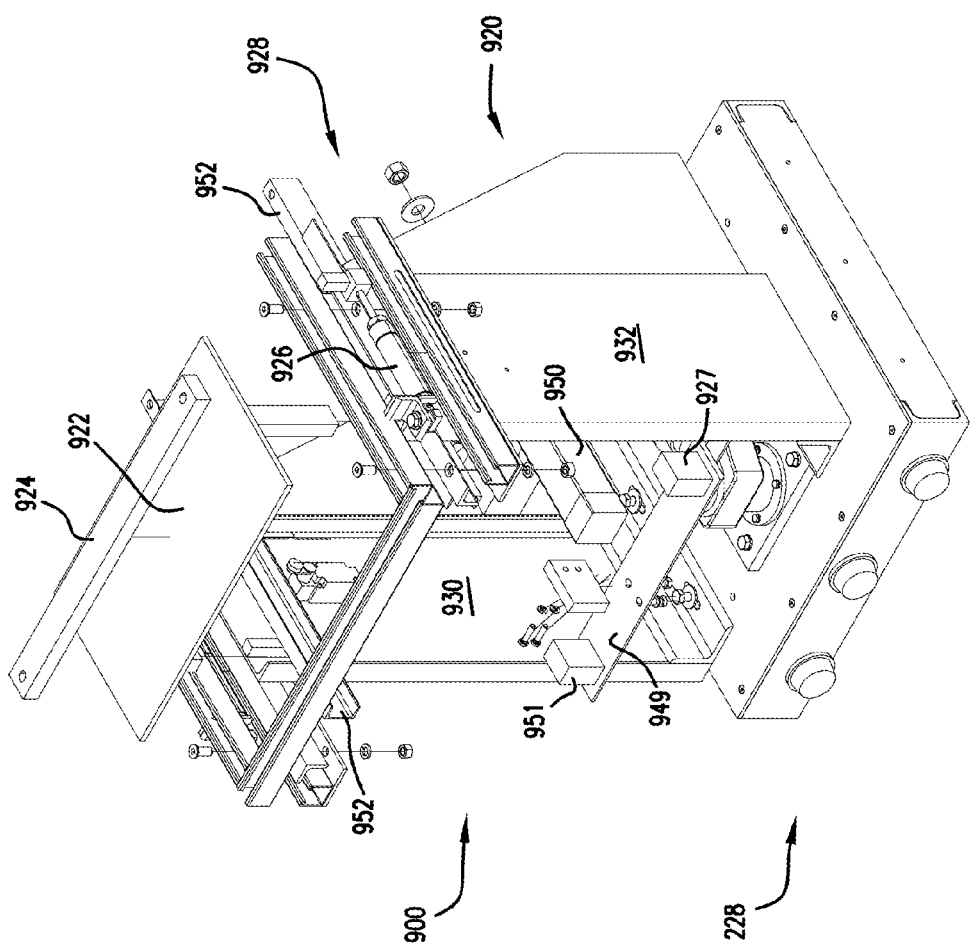
FIG. 9 is a schematic perspective view of the chord web panel trolley, shown in FIG. 6, carrying a chord web panel press stand.

FIG. 9 is a perspective view of chord web panel trolley 228 carrying a chord web panel press stand 900. Chord web panel trolley 228 is any one of bottom left trolley 230, bottom right trolley 232, top left trolley 234, top left center trolley 236, top right center trolley 238, and top right trolley 240. In addition, chord web panel press stand 900 is any one of the chord web panel press assemblies associated with the respective chord web panel trolley 228. However, the height of press stands associated with bottom chord rail 210 is somewhat less than the height of press stands associated with left and right rake rails 214 and 216, due to the fact that the bottom chord rail 210 is elevated with legs 310, as shown and described herein.

Chord web panel press stand 900 includes housing 920, table 922, chord guide 924, locking mechanism 926, and head adjustment mechanism 928. Housing 920 includes walls 930 and 932, which extend generally vertically up from the top of chord web panel trolley 228. Housing 920 is fastened to chord web panel trolley 228 by any suitable fasteners.

Stool 949 is connected to chord web panel press stand 900 and supports a number of air solenoids, including air cylinder solenoid 951 and air lock solenoid 927. The air solenoids are connected to compressed air supply 254 (shown in FIG. 2) such as through a supply hose. Air lock solenoid 927 is controlled by the control system and operates to control air flow to locking mechanism 926. Air cylinder solenoid 951 is controlled by the control system and operates to control air flow to air cylinder 950.

Table 922 is a generally horizontal plate connected across upper surfaces of walls 930 and 932. Chord guide 924 is supported by walls 930 and 932, such that the guide portion of chord guide 924 extends at least partially above a top surface of table 922. In another embodiment, chord guide 924 is mounted above top surface 922. Chord guide 924 is adjustable if desired. Chord guide 924 performs the function of guiding a top or bottom chord into the appropriate position during assembly of a truss. The thickness of chord guide 924 is less than the thickness of the truss chord such that the chord guide will not interfere with a press operation.

Locking mechanism 926 operates in the same way as locking mechanism 826, shown and described with reference to FIG. 8. Locking mechanism includes air powered pistons that extend to receive truss members, and retract to apply a force to lock the truss members between a foot of locking mechanism 926 and chord guide 924.

Head adjustment mechanism 928 includes air cylinder 950, air cylinder solenoid 951, and tracks 952 and operates in the same way as head adjustment mechanism 828 shown and described with reference to FIG. 8. Air cylinder 950 connects with head adjustment beam (such as 1120, shown in FIGS. 11-12) and is controlled by air cylinder solenoid 951, which is controlled by the control system to extend and retract the press head. Air cylinder solenoid 951 is connected to a hose of compressed air supply 254 (shown in FIG. 2) and operates to control the air flow to air cylinder 950. Tracks 952 receive rollers of the press head to slidably support the press head on chord web panel press stand 900.

Chord web panel trolley 228 also supports home position sensor 940. Home position sensor 940 detects the presence of a home position marker connected to the bottom chord rail, and communicates the detection to the control system. Home position sensor 940 can be any suitable detector, such as an infrared transmitter and receiver, light emitter and detector, a magnetic detector, and the like.

Figure 10:
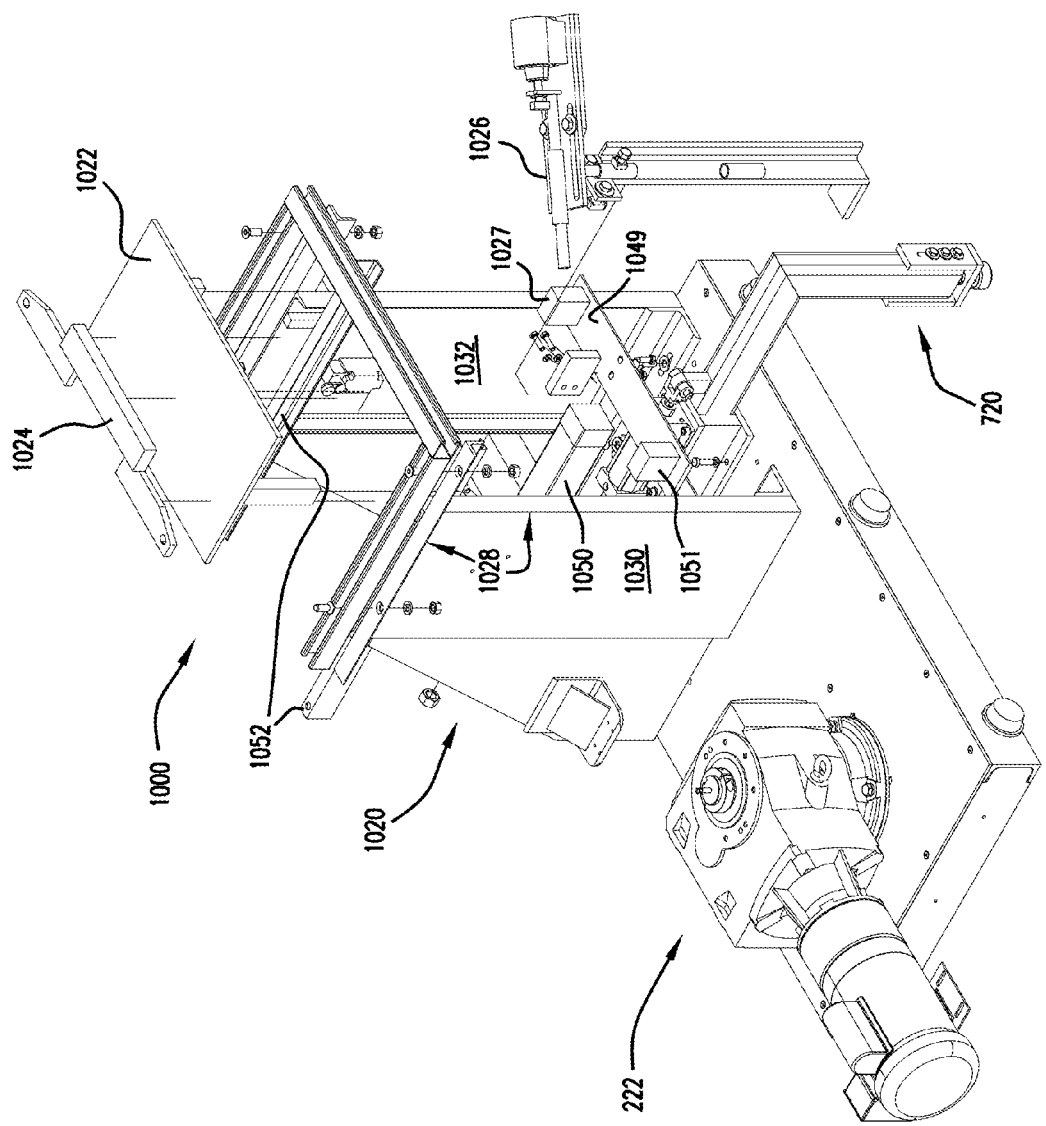
FIG. 10 is a schematic perspective view of the right heel trolley shown in FIG. 7, carrying a right heel press stand.

FIG. 10 is a perspective view of an example right heel trolley 222 carrying a right heel press stand 1000. Right heel trolley 222 includes height adjustment assembly 720 that slidably connects with right rake rail 216. Right heel press stand 1000 is a mirror image of a left heel press stand carried by left heel trolley 220, and therefore need not be separately and specifically described herein. Right heel press stand 1000 includes housing 1020, table 1022, heel guide 1024, locking mechanism 1026, and head adjustment mechanism 1028. Housing 1020 includes walls 1030 and 1032, which extend generally vertically up from the top of right heel trolley 222. Housing 1020 is fastened to right heel trolley 222 by any suitable fastener.

Stool 1049 is connected to right heel press stand 1000 and supports a number of air solenoids, including air cylinder solenoid 1051 and air lock solenoid 1027. The air solenoids are connected to compressed air supply 254 (shown in FIG. 2) such as through a supply hose. Air lock solenoid 1027 is controlled by the control system and operates to control air flow to locking mechanism 1026. Air cylinder solenoid 1051 is controlled by the control system and operates to control air flow to air cylinder 1050.

Table 1022 is a generally horizontal plate connected across upper surfaces of walls 1030 and 1032. Heel guide 1024 is supported by walls 1030 and 1032, such that guide portions of heel guide 1024 extend at least partially above a top surface of table 1022. In another embodiment, heel guide 1024 is located on top of table 1022. Heel guide 1024 performs the function of guiding truss members into the appropriate position during assembly of a truss. The thickness of heel guide 1024 is less than the thickness of the truss members such that the heel guide will not interfere with a press operation.

Locking mechanism 1026 includes an air cylinder that holds the heel of a truss against heel guide 1024 during a press operation. Locking mechanism 1026 includes a shaft that extends from the locking mechanism to press the heel against heel guide 1024, and holds the heel in this position during the press operation.

Head adjustment mechanism 1028 includes air cylinder 1050, air cylinder solenoid 1051, and tracks 1052 and operates in the same way as head adjustment mechanism 828 shown and described with reference to FIG. 8. Air cylinder 1050 connects with head adjustment beam (such as 1120, shown in FIGS. 11-12) and is controlled by air cylinder solenoid 1051, which is controlled by the control system to extend and retract the press head. Air cylinder solenoid 1051 is connected to a hose of compressed air supply 254 (shown in FIG. 2) and operates to control the air flow to air cylinder 1050. Tracks 1052 receive rollers of the press head to slidably support the press head on right heel press stand 1000.

Figure 12:
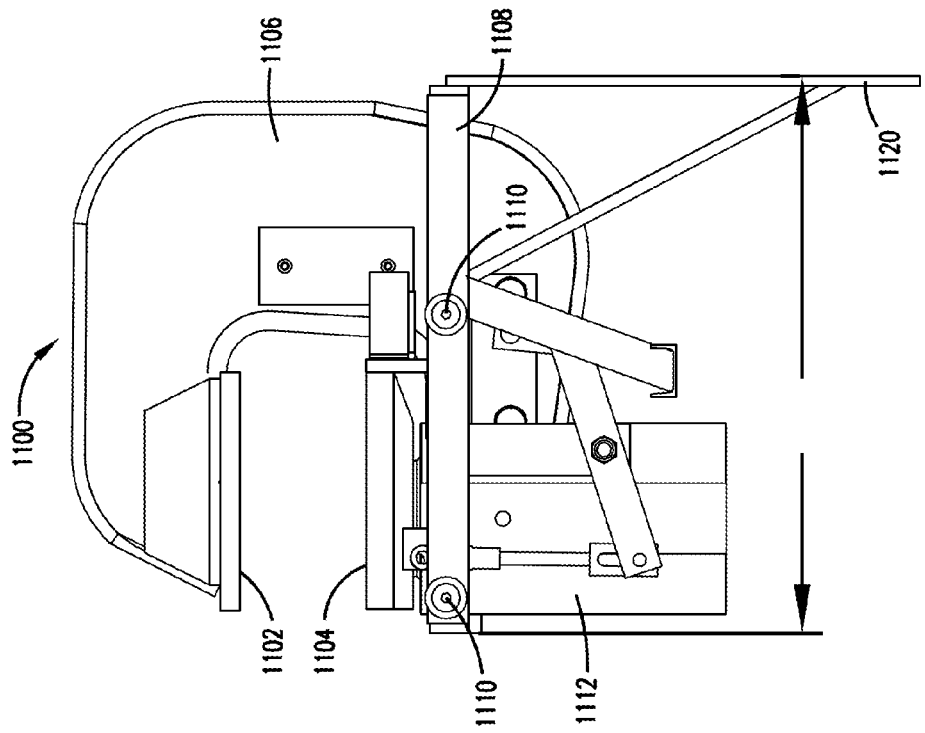
FIG. 12 is a schematic side view of the press head shown in FIG. 11.
Figure 11:
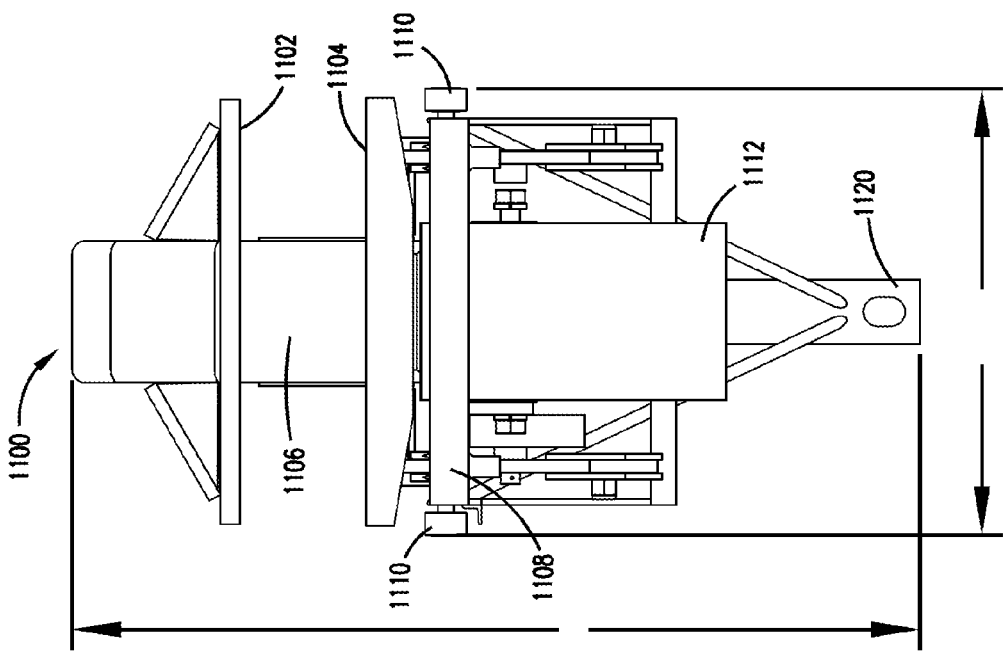
FIG. 11 is a schematic front view of an example press head of the assembly system shown in FIG. 1.

FIGS. 11 and 12 illustrate an example of a press head 1100. FIG. 11 is a front view and FIG. 12 is a side view of press head 1100. Press head 1100 includes top press plate 1102, bottom press plate 1104, C-beam 1106, support frame 1108, rollers 1110, and hydraulics box 1112.

Top press plate 1102 is the portion of press head 1100 that generates a vertically downward force to embed a connection plate into the truss members to connect adjacent truss members. Top press plate 1102 is connected to one end of C-beam 1106. The other end of C-beam 1106 is connected to hydraulics box 1112. Hydraulics box 1112 contains one or more hydraulic cylinders that raise and lower C-beam 1106 and top press plate 1102 relative to bottom press plate 1104. The hydraulic cylinder is controlled by the control system to maintain C-beam 1106 and top press plate 1102 in a normally open position, such as shown in FIGS. 11 and 12. When a press operation is desired, the hydraulic cylinder is operated to move top press plate 1102 in a direction toward bottom press plate 1104 until it comes into contact with the truss members and the connection plate. The force applied by the hydraulic cylinder is sufficient to embed the connection plate into the truss members to firmly connect the truss members together. Hydraulics box 1112 is connected to a hydraulic supply (such as hydraulic fluid supply 252 shown in FIG. 2) via a hydraulic line. In one embodiment, the hydraulic supply provides a pressure of up to 2000 pounds per square inch (PSI), which has been found to be adequate to achieve complete embedment of the connection plate into the truss members.

All press heads are generally operated at approximately the same time to embed the connection plates approximately simultaneously, although there is no requirement that they do so. Support frame 1108 connects and supports the various components of the press head 1100, through rollers 1110, to the press stand.

Figure 13:
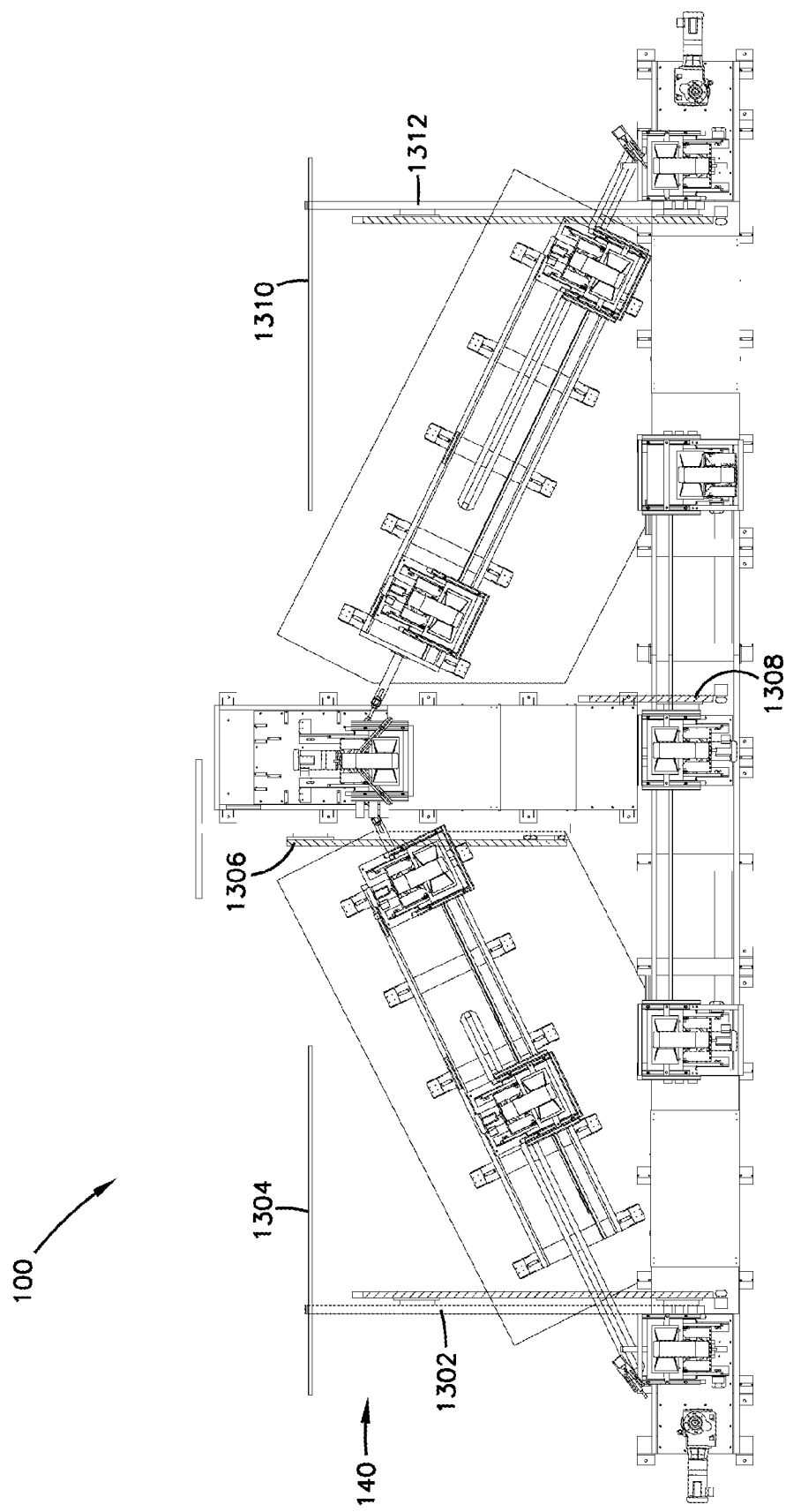
FIG. 13 is a schematic top view of the assembly system shown in FIG. 1 including an ejector system.

FIG. 13 is a top view of assembly system 100 including ejector system 140. Ejector system 140 includes left heel ejector 1302, left rail 1304, peak ejector 1306, bottom chord ejector 1308, right rail 1310, and right heel ejector 1312. Left and right heel ejectors 1302 and 1312 are mirror images of each other. Right heel ejector 1302 and right rail 1304 are illustrated and described in more detail with reference to FIG. 14. Peak ejector 1306 is illustrated and described in more detail with reference to FIG. 15. Bottom chord ejector 1308 is illustrated and described with reference to FIG. 16.

Figure 14:
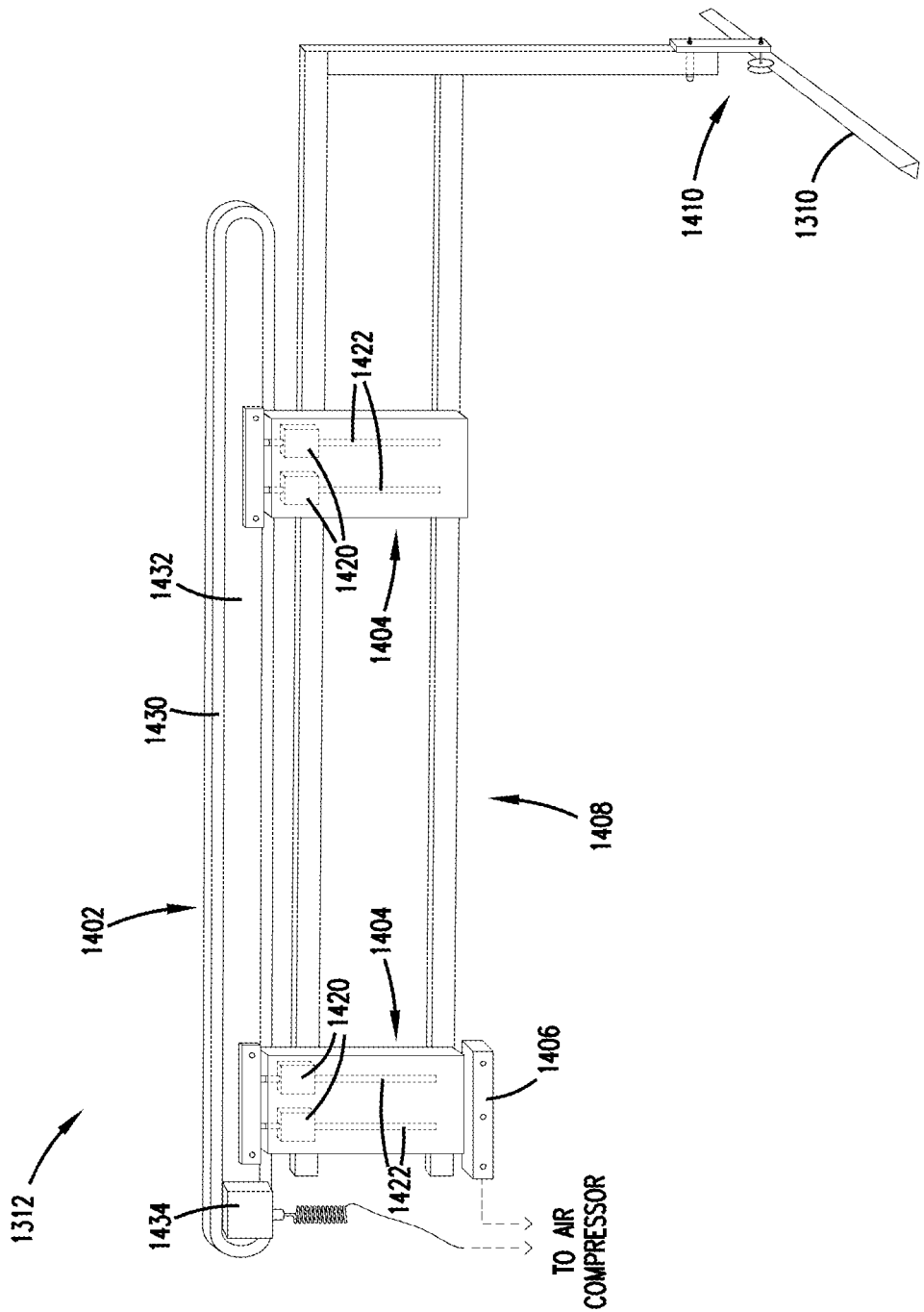
FIG. 14 is a schematic perspective view of an example right heel ejector of the ejector system shown in FIG. 13.

FIG. 14 is a perspective view of right heel ejector 1312 used to move an assembled truss out and away from assembly system 100. Right heel ejector 1312 includes conveyor system 1402, vertical ejectors 1404, connection bar 1406, frame 1408, wheel support 1410, and right rail 1310.

Right heel ejector 1312 is connected at one end to right heel press stand 1000 at connection bar 1406. For example, connection bar 1406 can be connected to wall 1032 of right heel press stand 1000 by fasteners, such as nuts and bolts, screws, nails, rivets, adhesives, or other fasteners. In this way, this end of right heel ejector 1312 is supported in the elevated position shown. When right heel trolley 222 (carrying right heel ejector 1312) is advanced along bottom chord rail 210, right heel ejector 1312 is also advanced. When this occurs, the other end of right heel ejector 1312 is also able to move due to wheel support 1410. Wheel support 1410 is connected to frame 1408 at an end opposite connection bar 1406. Wheel support 1410 extends vertically downward from frame 1408 and includes a roller at the bottom. In the illustrated embodiment, the roller has a generally "V-shaped" concave groove. The roller is supported and guided by right rail 1310.

In one embodiment, right rail 1310 has a triangular cross-sectional shape, and is rigidly mounted to foundation 200 such that the peak of the triangle points in a generally vertically upward direction. In another embodiment, right rail 1310 has a generally "V-shaped" cross-section. Other shapes of the roller and roller guide could also be used, so long as the shapes are compatible with each other. Right rail 1310 is oriented substantially parallel with bottom chord rail 210 such that as right heel trolley 222 advances along bottom chord rail 210, wheel support 1410 is also advanced along right rail 1310.

In the illustrated embodiment, frame 1408 includes two generally horizontal and parallel beams that are spaced from each other. Frame 1408 extends between connection bar 1406 and wheel support 1410. Mounted to frame 1408 are vertical ejectors 1404. In the illustrated embodiment, right heel ejector 1312 includes two vertical ejectors 1404. Vertical ejectors 1404 enable ejector system 140 (shown in FIG. 13) to vertically elevate, or eject, a fully assembled truss 90 from assembly system 100. More specifically, vertical ejectors 1404 lift a truss off of the press stands after a press operation has been completed and the press heads have been retracted out of the way.

Vertical ejectors 1404 include rotary actuators 1420 and lift rods 1422. In one embodiment, rotary actuators 1420 are air powered (pneumatic) motors that receive a compressed air input that can be run along or within frame 1408. The compressed air input is supplied by a compressed air supply (such as 254, shown in FIG. 2). When activated, rotary actuators 1420 rotate and engage with lift rods 1422, causing lift rods 1422 to move in a vertically upward direction. For example, lift rods 1422 include gear racking that is advanced relative to rotary actuators 1420 when the rotary actuators are activated. As lift rods 1422 advance, they lift conveyor system 1402, which is connected to the upper ends of lift rods 1422. Lifting continues until lift rods 1422 and conveyor system 1402 are in the fully elevated position. Rotary actuators 1420 are also used to lower lift rods 1422 after a truss has been completely advanced off of conveyor system 1402.

After a truss has been lifted, conveyor system 1402 is activated to move the assembled truss away from assembly system 100. Conveyor system 1402 includes conveyor belt 1430, conveyor frame 1432, and rotary actuator 1434. Conveyor belt 1430 extends around frame 1432 and is a belt, chain, or the like for conveying the truss along the upper surface of frame 1432. To move the assembled truss away from assembly system 100, rotary actuator 1434 is activated. Rotary actuator 1434 is supported at one end of frame 1432 and causes conveyor belt 1430 to rotate around frame 1432. As shown in FIG. 14, conveyor belt 1430 rotates around frame 1432 in a clockwise direction, such that a truss on top of belt 1430 is moved in generally horizontal direction away from rotary actuator 1434, and toward wheel support 1410. Conveyor system 1402 is used to transport the truss away from assembly system 100, and to another location where the truss will typically be stacked and prepared for shipping. For example, conveyor system 1402 can transfer a truss to another conveyor system, a stacking system, or to people who manually receive the assembled truss. In some embodiments, rollers are used to guide and support conveyor belt 1430 around frame 1432.

Figure 15:
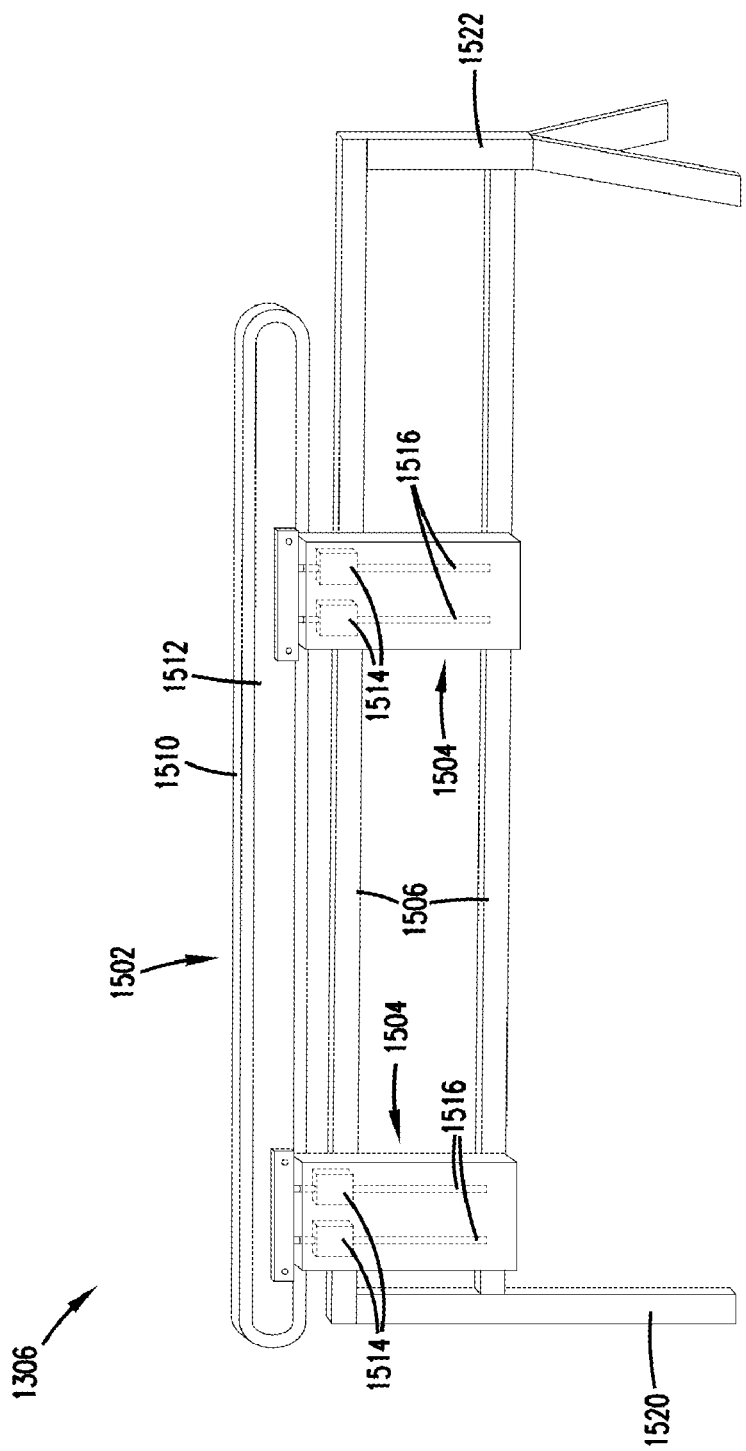
FIG. 15 is a schematic perspective view of an example peak ejector of the ejector system shown in FIG. 13.

FIG. 15 is a perspective view of an example peak ejector 1306. Peak ejector 1306 includes conveyor system 1502, vertical ejectors 1504, and frame 1506. Peak ejector 1306 operates to eject and support a truss near the peak of the truss as it is being removed from assembly system 100. Although peak ejector 1306 is illustrated as being on the left side of peak rail 212, it is recognized that peak ejector 1306 could also be located on the right side of peak rail 212, or in other positions.

Conveyor system 1502 includes conveyor belt 1510 and frame 1512. Conveyor belt 1510 is a belt or chain that is free to rotate around frame 1512. In this embodiment, however, conveyor belt 1510 is not powered, as adequate power is supplied by conveyor system 1402 (and the conveyor system of the left heel ejector) such that additional motors are not necessary. In another embodiment, however, conveyor system 1502 also includes a rotary actuator to provide power to conveyor belt 1510.

In another possible embodiment, conveyor system 1502 is replaced by a flat support surface, having a smooth top surface on which the truss can slide. For example, an upside-down ski-shape can be used. In one example, the top surface of conveyor system 1502 is formed of an Ultra High Molecular Weight (UHMW) material, such as UHMW polyethylene, high modulus polyethylene (HMPE), high performance polyethylene (HPPE), and the like. This is beneficial to provide a wear resistant surface on which the truss can slide. Alternatively, metal, wood, plastic, or other materials could also be used in other embodiments. In this embodiment, peak ejector 1306 does not need a powered conveyor 1502 because adequate power is provided by right and left heel ejectors 1302 and 1314, as well as from bottom chord ejector 1308.

Vertical ejectors 1504 include rotary actuators 1514 and lift rods 1516. Lift rods 1516 are connected to frame 1512. When rotary actuators 1514 are activated, they engage with lift rods 1516 to supply a vertical force to lift rods 1516 sufficient to raise lift rods 1516 and conveyor system 1502. Rotary actuators 1514 are also used to lower lift rods 1516 after a truss has been completely advanced off of conveyor system 1502.

Frame 1506 is a generally rectangular frame having two spaced and generally horizontal and perpendicular members. Frame 1506 is connected to foundation 200 at one end by leg 1520. In one embodiment, leg 1520 rests on top of foundation 200, but in another embodiment leg 1520 is mounted to foundation 200, such as with a fastener. At the other end of frame 1506, opposite leg 1520, is stand 1522. In the illustrated embodiment, stand 1522 has the shape of an inverted "Y." In one embodiment, stand 1522 rests on top of foundation 200, but in another embodiment stand 1522 is mounted to foundation 200. Vertical ejectors 1504 are supported by frame 1506.

Figure 16:
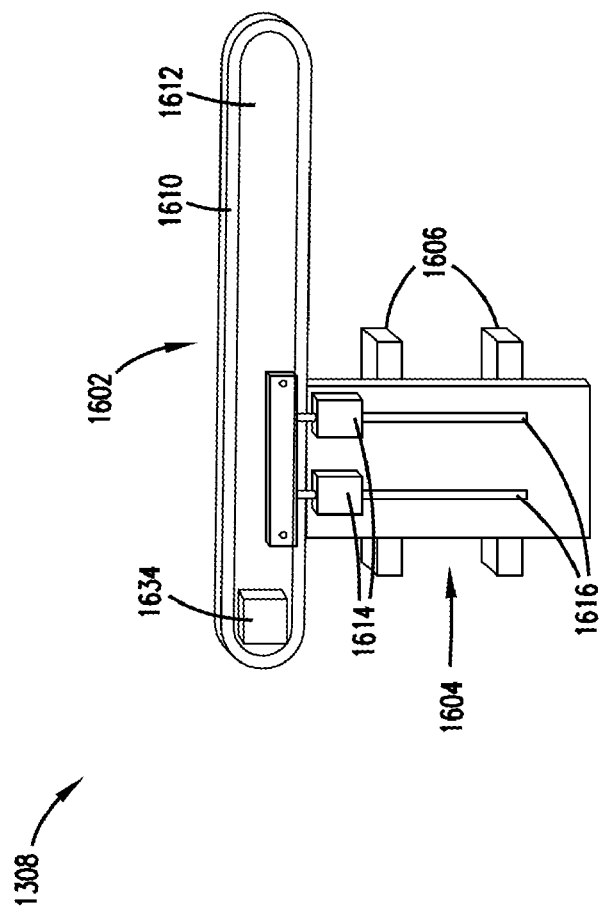
FIG. 16 is a schematic perspective view of an example bottom chord ejector of the ejector system shown in FIG. 13.

FIG. 16 is a perspective view of an example bottom chord ejector 1308. Bottom chord ejector 1308 includes conveyor system 1602, vertical ejector 1604, and connection bars 1606. Bottom chord ejector 1308 supports a bottom chord of an assembled truss as it is lifted and conveyed away from assembly system 100.

Conveyor system 1602 includes conveyor belt 1610, frame 1612, and rotary actuator 1634. Conveyor belt 1610 is a belt or chain that is free to rotate around frame 1612. Conveyor belt 1610 extends around frame 1612 and is a belt, chain, or the like for conveying the truss along the upper surface of frame 1612. To move the assembled truss away from assembly system 100 (shown in FIG. 1), rotary actuator 1634 is activated. Rotary actuator 1634 is supported at one end of frame 1612 and causes conveyor belt 1610 to rotate around frame 1612. As shown in FIG. 16, conveyor belt 1610 rotates around frame 1612 in a clockwise direction, such that a truss on top of belt 1610 is moved in a generally horizontal direction away from rotary actuator 1634.

Vertical ejectors 1604 include rotary actuators 1614 and lift rods 1616. Lift rods 1616 are connected to frame 1612. When rotary actuators 1614 are activated, they engage with lift rods 1616 to supply a vertical force to lift rods 1616 sufficient to raise lift rods 1616 and conveyor system 1602. Rotary actuators 1614 are also used to lower lift rods 1616 after a truss has been completely advanced off of conveyor system 1602.

Bottom chord ejector 1308 is supported by the splice press head stand carried by splice trolley 224. An example of splice press head stand is shown in FIG. 9. Bottom chord ejector 1308 is connected to the splice press head stand, such as by fastening connection bars 1606 to the side wall (e.g., 930, shown in FIG. 9), using fasteners.

Figure 17:
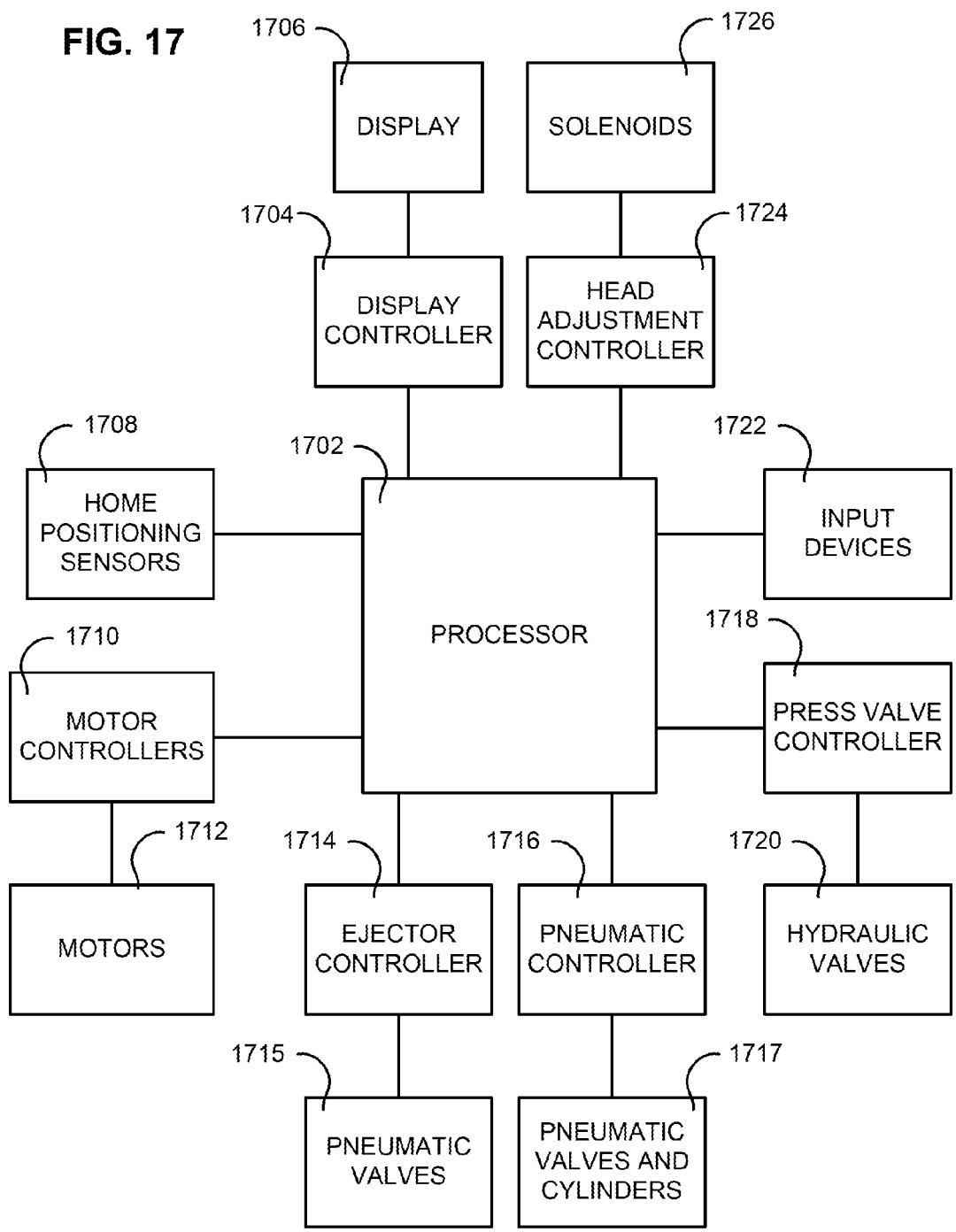
FIG. 17 is a schematic block diagram of an example control system of the assembly system shown in FIG. 1.

FIG. 17 is a block diagram of an example control system 150 of assembly system 100. Control system 150 includes processor 1702, display controller 1704, display 1706, home positioning sensors 1708, motor controllers 1710, motors 1712, ejector controller 1714, pneumatic valves 1715, pneumatic controller 1716, pneumatic valves and cylinders 1717, press valve controller 1718, hydraulic valves 1720, input devices 1722, head adjustment controller 1724, and solenoids 1726.

Processor 1702 is the central processing system of assembly system 100. In one embodiment, processor 1702 is a programmable logic controller. Alternatively, various other processing devices can also be used including microprocessors, central processing units ("CPUs"), microcontrollers, field programmable gate arrays, digital signal processing ("DSP") devices, and the like. Processing devices may be of any general variety such as reduced instruction set computing (RISC) devices, complex instruction set computing devices ("CISC"), or specially designed processing devices such as an application-specific integrated circuit ("ASIC") device.

Processor 1702 communicates with home positioning sensors 1708, motor controller 1710, ejector controller 1714, pneumatic controller 1716, press valve controller 1718, input devices 1722, and head adjustment controller 1724. Processor 1702 is programmed to control these components to enable assembly system 100 to perform various sets of operations, as further described herein.

A home positioning sensor 1708 is located on each trolley. Home positioning sensors 1708 detect the presence of home position markers located on the rails to inform processor 1702 when the respective trolley has reached its home position. Home positioning sensors 1708 are any suitable detector, such as an infrared transmitter and receiver, light emitter and detector, a magnetic detector, and the like. In another embodiment, a switch is used to determine the home position and the home position marker is positioned to trigger the switch when the trolley reaches the home position.

Motor controllers 1710 communicate with processor 1702 and motors 1712 to control the operation of motors 1712. Motors 1712 are electric motors located on each of the trolleys. Motors 1712 drive a pinion that engages the gear racking to advance the trolley along the respective rail.

Ejector controller 1714 communicate with processor 1702 and control pneumatic valves 1715 to operate the ejector system. Pneumatic valves 1715 control air flow from an air compressor into rotary actuators that drive the vertical ejectors and the conveyor systems.

Pneumatic controller 1716 communicates with processor 1702 and controls pneumatic valves and cylinders 1717. For example, pneumatic controller 1716 controls air cylinders (such as 510, shown in FIG. 5) of the moveable rail assemblies 114 to adjust the moveable rail assemblies 114 between the run mode and the setup mode. In addition, pneumatic controller 1716 controls air cylinders (such as 826, 926, and 1026 of FIGS. 8-10 respectively) to operate the locking mechanisms.

Press valve controller 1718 communicates with processor 1702 and controls hydraulic valves 1720 to operate the press heads. The press heads are controlled by press valve controller to raise and lower the press head to embed the connection plate into truss members to assemble a truss and then to raise the press head after assembly has been completed.

Input devices 1722 enable a user or another device to provide input to control system 150. Examples of suitable input devices include a keyboard, mouse, touch pad, touch screen display, buttons, switches, a microphone and voice recognition system, and the like. Some input devices 1722 can also have a separate controller that operates between the input device and the processor.

Head adjustment controller 1724 communicates with processor 1702 and controls solenoids 1726. For example, head adjustment controller 1724 controls the operation of the solenoids (such as 828, 928, and 1028 shown in FIGS. 8-10 respectively) to extend or retract the press heads.

Figure 18:
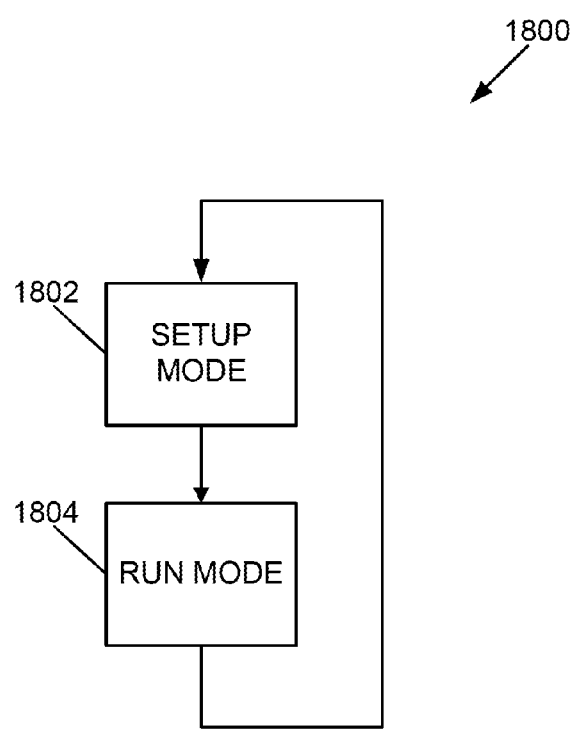
FIG. 18 is a schematic flow chart illustrating an example method of operating the assembly system shown in FIG. 1.

FIG. 18 is a flow chart illustrating an example method of operating assembly system 100. Method 1800 includes operation 1802 and operation 1804. During operation 1802, assembly system 100 is operated in a setup mode. While operating in the setup mode, the trolleys of assembly system 100 are moved into position for assembly of the truss having a desired truss configuration. For example, the trolleys are moved in order to assemble a truss having the desired bottom chord length and the desired pitch angle. Operation 1802 is described in more detail with reference to FIG. 19.

Operation 1804 is then performed, during which assembly system 100 is operated in the run mode. While operating in the run mode, assembly system 100 operates the press heads to embed connection plates into truss members and also to eject a truss after assembly has been completed. Operation 1804 is described in more detail with reference to FIGS. 20-22. After assembly of a particular truss configuration has been completed, assembly system 100 is returned to operation 1802 to setup for a different truss configuration.

Figure 19:
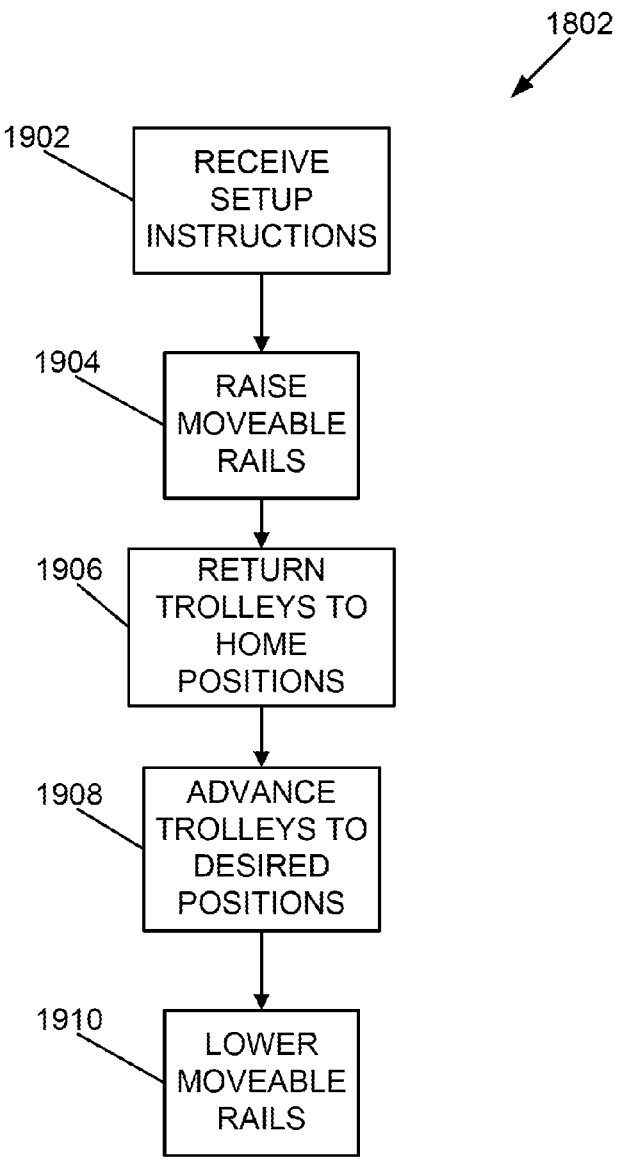
FIG. 19 is a schematic flow chart illustrating an example operation of the method shown in FIG. 18, during which the assembly system is operated in a setup mode.

FIG. 19 is a flow chart illustrating an example of operation 1802, during which assembly system 100 is operated in a setup mode. Operation 1802 includes operations 1902, 1904, 1906, 1908, and 1910.

Operation 1802 begins with operation 1902, during which setup instructions are received. In one embodiment, setup instructions are received from a user, such as through input device 1722, shown in FIG. 17. Setup instructions instruct assembly system 100, for example, what truss configuration is desired for the next round of truss assembly. Truss configuration information includes, for example, the type of truss to be assembled, the width of the truss, the width of the bottom chord, the pitch of the roof, the width of truss members (such as whether using boards having 4 inch widths or 8 inch widths), whether the truss should have elevated heels (such as to construct an energy heel truss), and if so the desired elevation of the heel. In one embodiment, a user interface is displayed to the user on display 1706. The user interacts with the user interface using one or more input devices to provide the truss configuration information.

After receiving the setup instructions, operation 1904 is then performed to begin adjusting assembly system 100 to the desired configuration. During operation 1904 the moveable rail assemblies 114 (e.g., left and right rake rails 214 and 216, such as shown in FIG. 2) are raised to enable them to be moved. As described herein, raising the moveable rail assemblies 114 involves activating a set of air cylinders to extend the air cylinders connected to ball transfer rollers. As the air cylinders are extended, the ball transfer rollers engage with plates 202 and 204 and the moveable rail is elevated relative to plates 202 and 204. In this way, moveable rail assemblies 114 are supported on the ball transfer rollers, rather than on rail ties 506, such that moveable rail assemblies 114 are free to roll along the surface of plates 202 and 204. The moveable rail assemblies 114 are connected at one end to peak head trolley 226 and at the other end to one of left heel trolley 220 and right heel trolley 222.

With the moveable rail assemblies 114 in their elevated positions, operation 1906 is next performed to return the trolleys to their home positions. Operation 1906 involves advancing the trolleys toward the respective home position marker until the home position sensor on each trolley detects the presence of the home position marker indicating that the trolley has reached the home position. This is beneficial to ensure that each time that assembly system 100 is arranged into a new configuration, the trolleys are properly positioned. In order to do so, operation 1906 returns all trolleys to the home position before advancing them to their appropriate positions for the next round of assembly. As peak head trolley 226 and left and right heel trolleys 220 and 222 are moved, left and right rake rails 214 and 216 are also repositioned accordingly.

When a trolley reaches the home position, the home position sensor detects the presence of the home position marker and generates a home position signal to alert the control system that it has reached the home position. Once the control system has received the home position signal, the control system generates a signal informing the motor controller to stop advancing the respective trolley. As a result, the trolley comes to a rest at the home position and awaits further instructions.

In some possible embodiments, operation 1906 is not required. In such embodiments, control system 150 knows the position of the trolleys at all times, relative to the home position, such that control system 150 can move the trolleys directly to the desired position from the current position.

Once all trolleys have been returned to their home positions, operation 1908 is then performed to advance the trolleys to the desired positions. The desired positions are determined by the control system by evaluating the setup instructions received during operation 1902. In one embodiment, the specific trolley locations are determined by performing calculations based on the setup instructions to determine the distance that a trolley should travel from its home position to the desired new positions. In another embodiment, a lookup table is used. The lookup table includes the distances for a variety of different truss configurations. These distances are read from the lookup table by the control system, and used to determine how far the trolleys need to move.

In one embodiment, the distances are determined by rotation sensors that determine the number of rotations of the pinion of each trolley. The number of rotations can be multiplied by the distance a trolley moves per rotation to determine the total distance a trolley has traveled. Alternatively, the lookup table or calculation can be performed to determine the desired number of rotations directly. The motor controller counts the number of rotations. When it is determined that the motor has reached the desired location, the trolleys are stopped at that location.

Once all trolleys have been advanced to the desired positions, operation 1910 is then performed to lower the moveable rail assemblies 114. In one embodiment, operation 1910 involves retracting the air cylinders of the moveable rail assemblies 114 to lower the rails, such that the rail ties come to rest on plates 202 and 204, and elevating the ball transfer rollers from plates 202 and 204. Once the moveable rail assemblies 114 have been lowered, the moveable rail assemblies 114 are frictionally engaged with one of plates 202 and 204 to resist further movement of the moveable rail assemblies 114.

Figure 20:
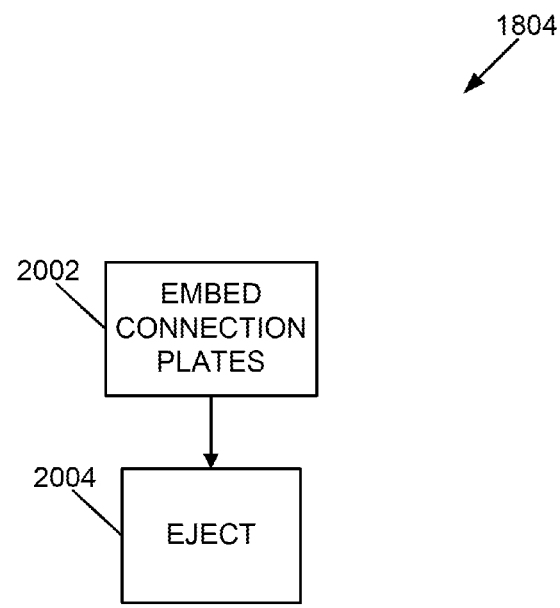
FIG. 20 is a schematic flow chart illustrating an example operation of the method shown in FIG. 18, during which the assembly system is operated in a run mode.

FIG. 20 is a flow chart illustrating an example of operation 1804, during which assembly system 100 is operated in a run mode. Operation 1804 includes operation 2002 and operation 2004.

During operation 2002, assembly system 100 is operated to activate the press heads to embed the connection plates into the truss members. Operation 2002 is described in more detail with reference to FIG. 21. Following operation 2002, operation 2004 is performed to eject and remove the assembled truss from assembly system 100. Operation 2002 is described in more detail with reference to FIG. 22.

Figure 21:
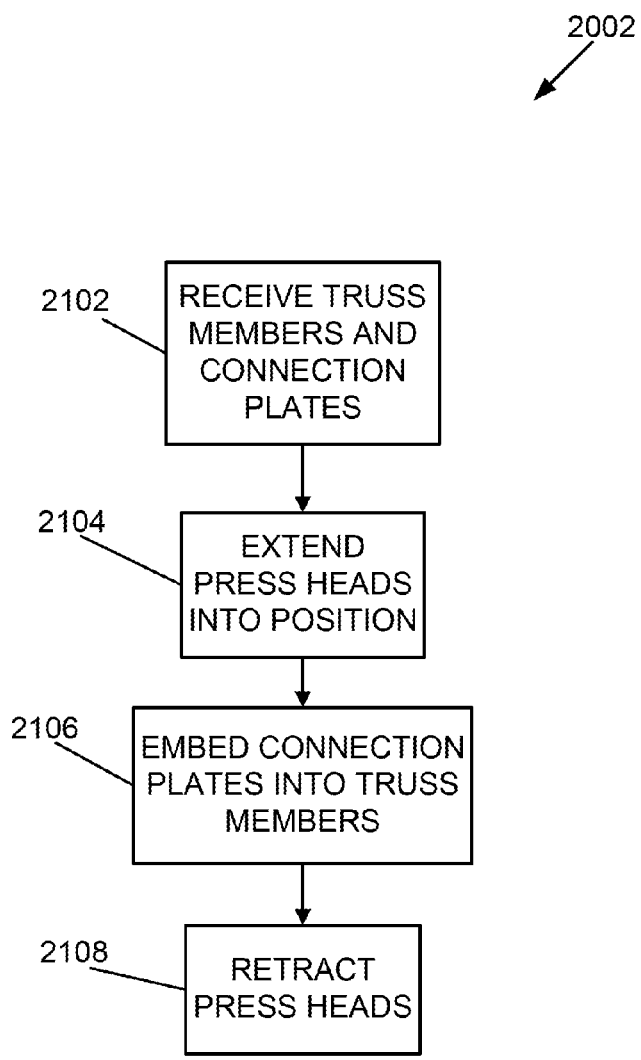
FIG. 21 is a schematic flow chart illustrating an example operation of the method shown in FIG. 18, during which connection plates are embedded into truss members.

FIG. 21 is a flow chart illustrating an example of operation 2002, during which connection plates are embedded into the truss members. Operation 2002 includes operations 2102, 2104, 2106, and 2108.

During operation 2102 truss members and connection plates are received by assembly system 100. In one embodiment, pre-cut truss members are first manually placed onto assembly system 100, such as by one or more human operators of assembly system 100. In another embodiment, truss members are automatically supplied to assembly system 100, such as via robotic arms or conveyor systems. Once the truss members are in place, connection plates are placed over the joints between truss members. Connection plates can also be positioned manually by human operators, or automatically such as with robots or a conveyor system.

Once the truss members and connection plates have been put into place, operation 2104 is performed to extend press heads 2104 into a position vertically above the connection plate. The press heads are maintained in a retracted position during operation 2102 to enable the truss members and connection plates to be more easily loaded. In preparation for the press operation, the press heads are now extended in operation 2104. In one embodiment, the press head is extended by a pneumatic cylinder connected to the press stand, which receives a supply of compressed air from a hose connected to the compressed air supply.

After the press heads have been extended, operation 2106 is performed to embed the connection plates into the truss members. In one embodiment, operation 2106 involves the activation of the press heads by opening a hydraulic valve. In doing so, the press head is lowered until it comes into contact with the connection plate. The press head then applies a force from top press plate (e.g., 1102, shown in FIG. 12) to the connection plate, to embed the connection plate into the truss members.

Once the connection plate has been fully embedded into the truss members, operation 2108 is performed to retract the press heads. In one embodiment, the press heads are retracted by extending the pneumatic cylinder connected to the press stand. In doing so, the press head is retracted out of the way for removal of the assembled truss.

Figure 22:
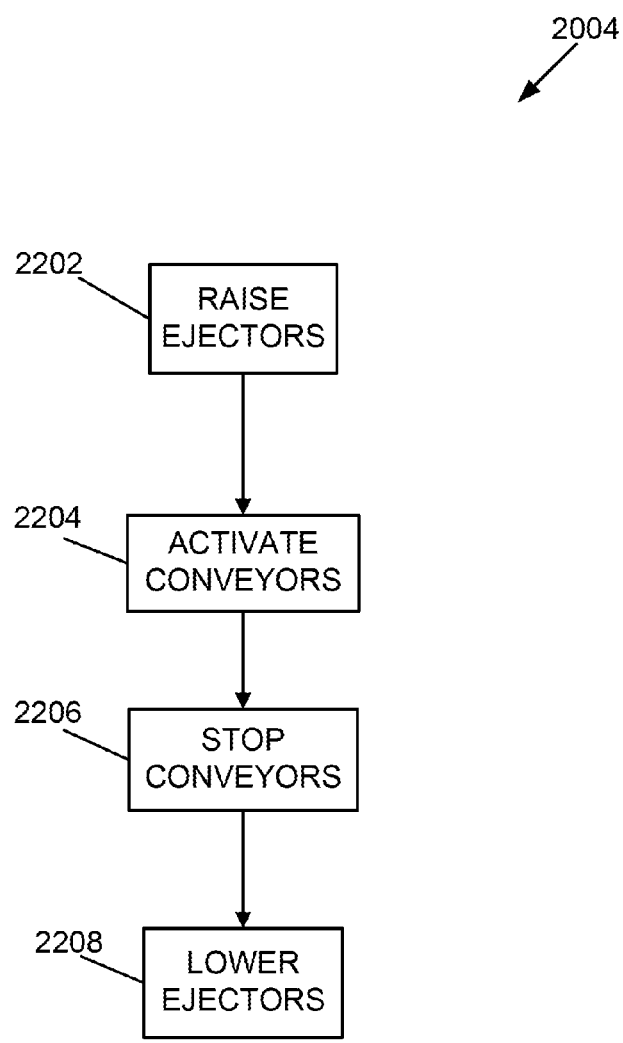
FIG. 22 is a schematic block diagram of an example operation of the method shown in FIG. 18, during which the assembled truss is ejected from the assembly system shown in FIG. 1.

FIG. 22 is a block diagram of an example of operation 2004, in which the assembled truss is ejected from assembly system 100. Operation 2004 includes operations 2202, 2204, 2206, and 2208.

Having completed assembly of the truss, the truss is now ready to be removed from assembly system 100. To do so, operation 2004 is performed, beginning with operation 2202. In operation 2202, the vertical ejectors of the ejection system are raised to elevate the truss above assembly system 100, on the conveyor systems.

With the vertical ejectors fully extended, operation 2204 is next performed to activate the conveyor systems. Upon activation, the conveyor belts of the conveyor systems begin to rotate. The truss rests on top of the conveyor belts and is transported along the conveyor belts in a direction away from assembly system 100. At this point, the truss is transferred off of the conveyor system. In one embodiment, a second conveyor system receives the truss and delivers the truss to the desired location. In another embodiment, a truss stacker receives the truss, and stacks it with other trusses (either vertically, horizontally, or at an angle) in preparation for shipping the trusses to a construction site, distribution facility, or warehouse.

Once the truss has been conveyed off of the conveyor systems, operation 2206 is performed to stop the conveyors. In one embodiment, operation 2206 operates after a period of time has elapsed following the activation of the conveyors (operation 2204). In another embodiment, a sensor is used to determine when the truss has completely left the conveyor system.

Operation 2208 is then performed to lower the ejectors in preparation for assembly of another truss or, if a new truss configuration is now desired, for adjusting assembly system 100 into the new configuration.

In one alternate embodiment of method 2004, operations 2204 and 2206 are not required to start and stop the conveyors each time the ejectors are raised. Rather, the conveyors are always on during operation of assembly system 100. In another alternate embodiment, operation 2206 is performed before operation 2202, such that the conveyor begins to move before or during the raising of the ejectors. In another alternate embodiment, operation 2206 is performed during or after operation 2208, such that the conveyor is stopped during or after the lowering of the ejectors.

The description provided herein is provided to illustrate some of the many possible embodiments of assembly system 100, but is by no means exhaustive of all possible embodiments. For example, reference has been made to various actuators including electric motors, pneumatic rotary actuators, solenoids, air cylinders, and the like. It is recognized that the embodiments are not limited to the specific implementation described, but rather embodiments can also be made by interchanging one actuator with another actuator. Furthermore, it is recognized that electric, hydraulic, pneumatic, and other power sources are also interchangeable so long as an actuator is selected to match the power source. For example, an electric solenoid can be exchanged with an air powered cylinder, an air powered cylinder can be exchanged with a hydraulic piston, and a hydraulic piston can be exchanged with an electric solenoid or other desired actuator.

It is also recognized that electrical communications can be made in a variety of methods, including direct electrical connection, or through a wireless communication system including radio communication, infrared communication, laser or light communication, and a variety of other communication methods. These and other modifications will be apparent to one of skill in the art upon a careful review of this specification.

The above specification, examples and data provide a complete description of the manufacture and use of the composition of the invention. It is noted that all of the features characterized herein need not be incorporated within a given arrangement for the arrangement to include improvements according to the present disclosure.

What is claimed is:

1. An automated assembly system for the assembly of a truss, the system comprising:
   a plurality of rail assemblies including:
      a first stationary rail assembly having a first pair of spaced and substantially parallel beams, the first stationary rail having first end, a second end opposite the first end, a midsection between the first end and the second end, a first segment between the first end and the midsection, and a second segment between the second end and the midsection;

a second stationary rail assembly having a second pair of spaced and substantially parallel beams, the second stationary rail extending away from the midsection and substantially perpendicular to the first stationary rail assembly;

a first moveable rail assembly having a third pair of spaced and substantially parallel beams, the first movable rail extending between the first segment of the first stationary rail and the second stationary rail assembly;

a second movable rail assembly having a fourth pair of spaced and substantially parallel beams, the second movable rail extending between the second segment of the first stationary rail and the second stationary rail assembly;

a plurality of trolleys supported by the rail assemblies and configured to move along the rail assemblies;

a plurality of press assemblies, each of the press assemblies being supported by one of the trolleys, the press assemblies having a press head configured to embed connection plates into the truss;

a plurality of ejector assemblies, each ejector assembly including:

a frame;

a vertical ejector supported by the frame and configured to raise the assembled truss in a substantially vertically upward direction;

a conveyor system supported by the vertical ejector and configured to move the assembled truss in a direction away from the automated assembly system, the conveyor system including a conveyor belt supported by the frame and configured to rotate around the frame; and a rotary actuator configured to receive a pneumatic input and generate a force to raise and lower the conveyor system, and to generate a force to rotate the conveyor belt to advance the assembled truss; and a control system programmed to control the movement of the trolleys on the rail assemblies and programmed to control the operation of the press heads.

2. The automated assembly system of claim 1, the trolleys comprising:

a first heel trolley supported by the first segment of the first stationary rail assembly;

a second heel trolley supported by the second segment of the first stationary rail assembly; and a peak trolley supported by the second stationary rail assembly.

3. The automated assembly system of claim 2, the trolleys further comprising a plurality of chord web panel trolleys located between any two of the first heel trolley, the second heel trolley, and the peak trolley.

4. The automated assembly system of claim 1, wherein the first movable rail assembly is connected between the first heel trolley and the peak trolley.

5. The automated assembly system of claim 4, wherein the second movable rail assembly is connected between the second heel trolley and the peak trolley.

6. The automated assembly system of claim 5, wherein the first issued movable rail assembly is slidably connected to one of the first and second heel trolleys to accommodate variable distances between the peak trolley and the first and second heel trolleys.

7. The automated assembly system of claim 1, wherein the control system is programmed to control the ejector assemblies.

* * * * *